United States Patent
Kondou

(10) Patent No.: US 10,198,365 B2
(45) Date of Patent: Feb. 5, 2019

(54) INFORMATION PROCESSING SYSTEM, METHOD AND MEDIUM

(71) Applicant: FUJITSU LIMITED, Kawasaki-shi, Kanagawa (JP)

(72) Inventor: Hiroshi Kondou, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 429 days.

(21) Appl. No.: 14/990,200

(22) Filed: Jan. 7, 2016

(65) Prior Publication Data
US 2016/0210248 A1    Jul. 21, 2016

(30) Foreign Application Priority Data
Jan. 20, 2015    (JP) .................................. 2015-008971

(51) Int. Cl.
*G06F 13/37*    (2006.01)
*G06F 12/14*    (2006.01)
(Continued)

(52) U.S. Cl.
CPC .......... *G06F 12/1466* (2013.01); *G06F 9/544* (2013.01); *G06F 13/1663* (2013.01);
(Continued)

(58) Field of Classification Search
CPC ......... G06F 2221/0711; G06F 13/1663; G06F 17/30362; G06F 3/065; G06F 12/1466; G06F 21/31; G06F 2221/2115; G06F 21/6245; G06F 12/1458; G06F 21/33; G06F 21/57; G06F 2212/1052; G06F 21/60

See application file for complete search history.

(56) References Cited

U.S. PATENT DOCUMENTS 4,502,111 A * 2/1985 Riffe ..................... G06F 9/3816
                                                    524/236
5,859,960 A    1/1999 Kurihara et al.
(Continued)

FOREIGN PATENT DOCUMENTS

JP        7-311661       11/1995
JP        2004-185610    7/2004
(Continued)

*Primary Examiner* — David Yi
*Assistant Examiner* — Candice A Rankin
(74) *Attorney, Agent, or Firm* — Staas & Halsey LLP

(57) ABSTRACT

An information processing system includes: a shared memory including a plurality of regions comprising first region and second region; a memory token storing unit configured to store memory tokens, each of the memory tokens controlling access to a region of the shared memory; an access token storing unit configured to store access tokens for accessing a specific region of the shared memory, the access tokens including first access token to access the first region and second access token to access the second region; a processor configured to add the access tokens to a request for accessing the first region and transmit the request including the added access tokens; and a determination circuit configured to receive the transmitted request including the added access tokens, compare the added access tokens with a memory token corresponding to the first region, and control access to the first region based on the comparison.

15 Claims, 24 Drawing Sheets

(51) Int. Cl.
    *G06F 21/00*    (2013.01)
    *G06F 13/16*    (2006.01)
    *G06F 9/54*     (2006.01)
    *G06F 12/109*   (2016.01)

(52) U.S. Cl.
    CPC .... *G06F 12/109* (2013.01); *G06F 2212/1052* (2013.01); *G06F 2212/656* (2013.01)

(56) References Cited

U.S. PATENT DOCUMENTS

| | | | |
|---|---|---|---|
| 6,738,907 B1 * | 5/2004 | Carter | H04L 9/08 380/277 |
| 2004/0111581 A1 | 6/2004 | Arimilli et al. | |
| 2013/0173867 A1 * | 7/2013 | Ueki | G06F 12/1458 711/152 |
| 2013/0174224 A1 | 7/2013 | Ueki et al. | |

FOREIGN PATENT DOCUMENTS

| | | |
|---|---|---|
| JP | 2013-140446 | 7/2013 |
| WO | WO 03/090089 A1 | 10/2003 |

\* cited by examiner

FIG. 8

NODE 0 (HOME NODE)

| SEGMENT NUMBER | ADDRESS PA (OR RA) | SEGMENT SIZE | USAGE PERMISSION NODE NUMBER | PID OF APPLICATION IN USE | TOKEN |
|---|---|---|---|---|---|
| 0 | 0x000000000 | 256MB | 0, 2 | 123, 456, ... | 0x123 |
| 1 | 0x010000000 | 256MB | 0, 2 | 234, 567, ... | 0x456 |
| 2 | 0x020000000 | 256MB | 0, 3 | 345, 678, ... | 0x789 |
| 3 | 0x030000000 | 256MB | | | |
| 4 | 0x040000000 | 256MB | | | |
| ... | | | | | |

NODE 1 (HOME NODE)

| SEGMENT NUMBER | ADDRESS PA (OR RA) | SEGMENT SIZE | USAGE PERMISSION NODE NUMBER | PID OF APPLICATION IN USE | TOKEN |
|---|---|---|---|---|---|
| ... | | | | | |
| 16 | 0x100000000 | 256MB | 1, 2 | 135, 246, ... | 0x321 |
| 17 | 0x110000000 | 256MB | 1, 2 | 357, 468, ... | 0x654 |
| 18 | 0x120000000 | 256MB | 1, 4 | 579, 680, ... | 0x987 |
| 19 | 0x130000000 | 256MB | | | |
| 20 | 0x140000000 | 256MB | | | |
| ... | | | | | |

NODE 2 (REMOTE NODE)

| SEGMENT NUMBER | ADDRESS PA (OR RA) | SEGMENT SIZE | USAGE PERMISSION NODE NUMBER | PID OF APPLICATION IN USE | TOKEN |
|---|---|---|---|---|---|
| 0 | 0x000000000 | 256MB | | 321, 654, ... | 0x123 |
| 1 | 0x010000000 | 256MB | | 432, 765, ... | 0x456 |
| 2 | 0x020000000 | 256MB | | | |
| 3 | 0x030000000 | 256MB | | | |
| 4 | 0x040000000 | 256MB | | | |
| ... | | | | | |
| 16 | 0x100000000 | 256MB | | 531, 642, ... | 0x321 |
| 17 | 0x110000000 | 256MB | | 753, 864 | 0x654 |
| 18 | 0x120000000 | 256MB | | | |
| 19 | 0x130000000 | 256MB | | | |
| 20 | 0x140000000 | 256MB | | | |
| ... | | | | | |

INFORMATION PROCESSING SYSTEM, METHOD AND MEDIUM

CROSS-REFERENCE TO RELATED APPLICATION

This application is based upon and claims the benefit of priority of the prior Japanese Patent Application No. 2015-008971, filed on Jan. 20, 2015, the entire contents of which are incorporated herein by reference.

FIELD

The embodiments discussed herein are related to an information processing system, a method and a medium.

BACKGROUND

Conventionally, there is an information processing system in which a plurality of nodes having one or a plurality of CPUs and a shared memory are connected by a crossbar, and the shared memories in each of the nodes can be accessed by a CPU in another node. There has been proposed a technique for controlling access in such an information processing system by using memory tokens set to each of a plurality of regions included in the shared memory and access tokens which are added to a request from a CPU in another node for accessing a region having a memory token set thereto. Specifically, when a shared memory is accessed, the memory access in the request is permitted if the memory token and the access token added to the request match. According to this technique, permission for access from another node can be controlled for each region included in the shared memory.

Japanese Laid-Open Patent Publication No. 2013-140446 is an example of a related prior art document.

SUMMARY

According to an aspect of the invention, an information processing system includes: a shared memory including a plurality of regions comprising a first region and a second region; a memory token storing unit configured to store memory tokens, each of the memory tokens controlling access to a region of the shared memory; an access token storing unit configured to store access tokens, each access token representing access identification information for accessing a specific region of the shared memory, the access tokens including a first access token to access the first region and a second access token to access the second region; a first processor configured to add the access tokens to a request for accessing the first region and transmit the request including the added access tokens; and a determination circuit configured to receive the transmitted request including the added access tokens, compare the added access tokens with a memory token corresponding to the first region, and control access to the first region based on the comparison.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a segment management table in a shared memory created in each node;

DESCRIPTION OF EMBODIMENTS

The above technique is useful when used to transfer data as occasion calls between a protect region which protects access to the data and a non-protect region which does not protect the data. In this case, if processing for setting a memory token corresponding to the protect region and an access token in the CPU accessing the protected region is performed in advance, the copying of the data can be performed by using load commands and store commands of the CPU.

Figure 21:
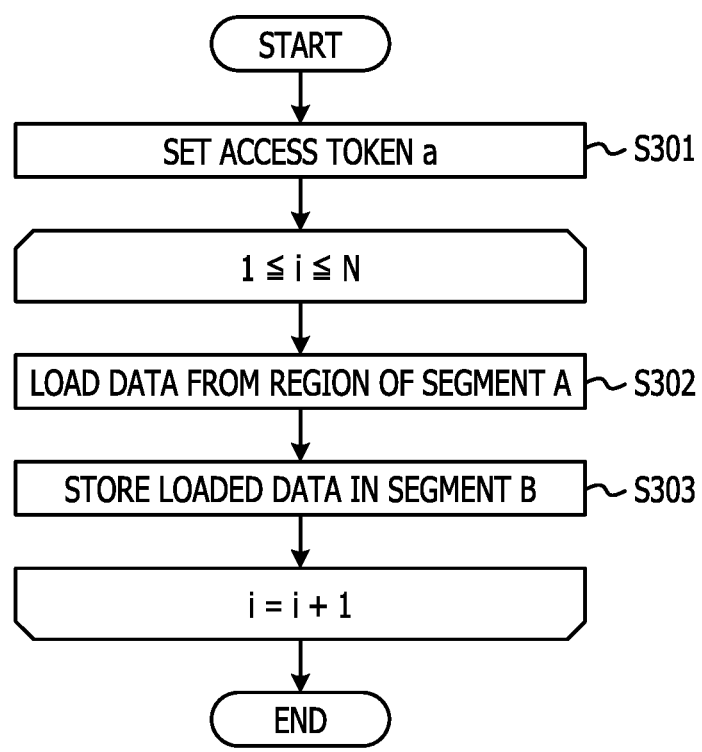
FIG. 21 is a flow chart illustrating a conventional example when accessing a memory using one access token.

For example, FIG. 21 illustrates an example of a flow chart when a certain node copies 8×N bytes in 8-byte units of data in a region of a segment A having a memory token value of "a" set thereto, to a normal local memory region having no memory token set thereto. First, in step S301, an access token "a" for accessing the segment A in the shared memory is set. Next, data is loaded in 8-byte units from the region of segment A and stored in a register X N number of times (step S302), and the value of the register X is stored in 8-byte units in a memory region of a segment B (step S303). In this case, the total number of steps is 2N+1, and when for example 64,000 bytes (N=8192) are transferred, the number of steps becomes 2×8192+1=16385.

However, if for example the CPU of a certain node copies the data between first and second shared memory regions having different memory tokens set thereto, the access tokens are set frequently. That is, because the data to be loaded and the data to be stored are stored in memory regions each having different memory tokens set thereto, it is desirable to reset the access tokens each time a load command and a store command are executed.

Figure 22:
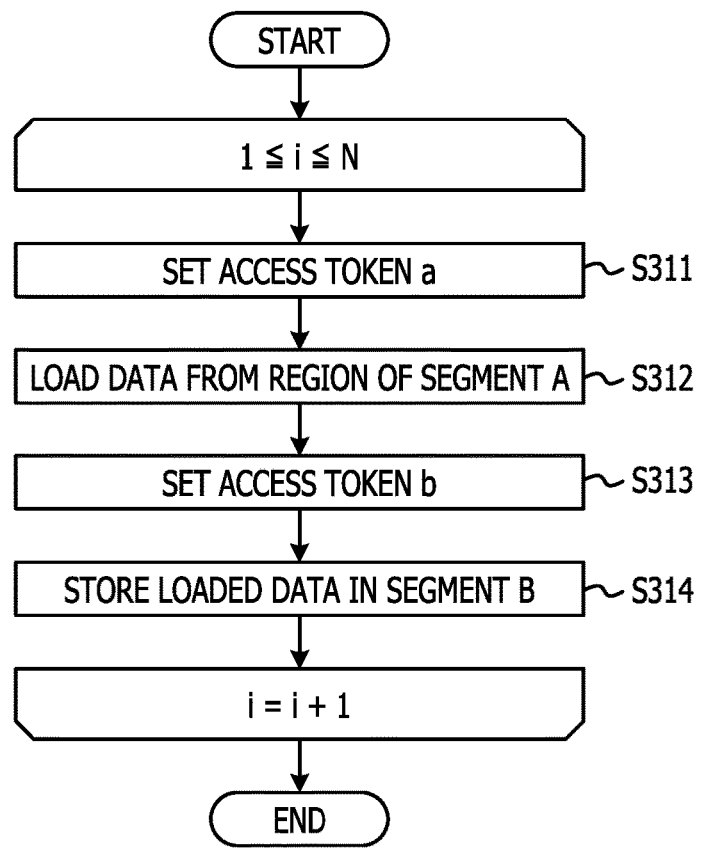
FIG. 22 is a flow chart illustrating a conventional example when copying data between different shared memories using one access token.

For example, FIG. 22 illustrates an example of a flow chart when a certain node copies 8×N bytes in 8-byte units of data in a region of a segment A having a segment token value of "a" set thereto, to a region of a segment B having a segment token value of "b" set thereto. In this case, it is desirable to reset the access tokens each time loading and storing is performed because the access tokens to be used when loading data from a data transfer source and storing the data in a data transfer destination are different.

Specifically, after setting the access tokens to the value "a" in the segment A (step S311), 8-byte units of data from the segment A are loaded into the register X (step S312). Then, after resetting the access tokens to the value "b" in the segment B (step S313), the value of the register X is stored in 8-byte units in the memory region of the segment B (step S314). 8×N-byte units of data are copied by repeating the actions in steps S311 to S314 N-number of times. In this case, the total number of steps is 4N, and when for example 64,000 bytes (N=8192) are transferred, the number of steps becomes 4×8192=32768.

While almost twice the number of steps occur in the example in FIG. 22 in comparison to the first example illustrated in FIG. 21, the cause thereof effects overhead for resetting the access tokens. As the size of the data to be copied increases, it is impossible to ignore the overhead for resetting the access tokens.

The overhead for resetting the access tokens when transferring data in this way is not limited to copying data, but is also generated when accessing in order memory regions set with different memory tokens with load commands and store commands. Therefore, when executing an application program for accessing a plurality of shared memory regions set with different memory tokens, it is desirable to reduce the overhead of the processing for frequently resetting the access tokens.

An object in one aspect of the embodiments disclosed herein is to reduce overhead for resetting access tokens when accessing a plurality of memory regions set with different memory tokens. The following embodiments shall be explained in detail with reference to FIGS. 1 to 20.

Embodiment 1

Figure 1:
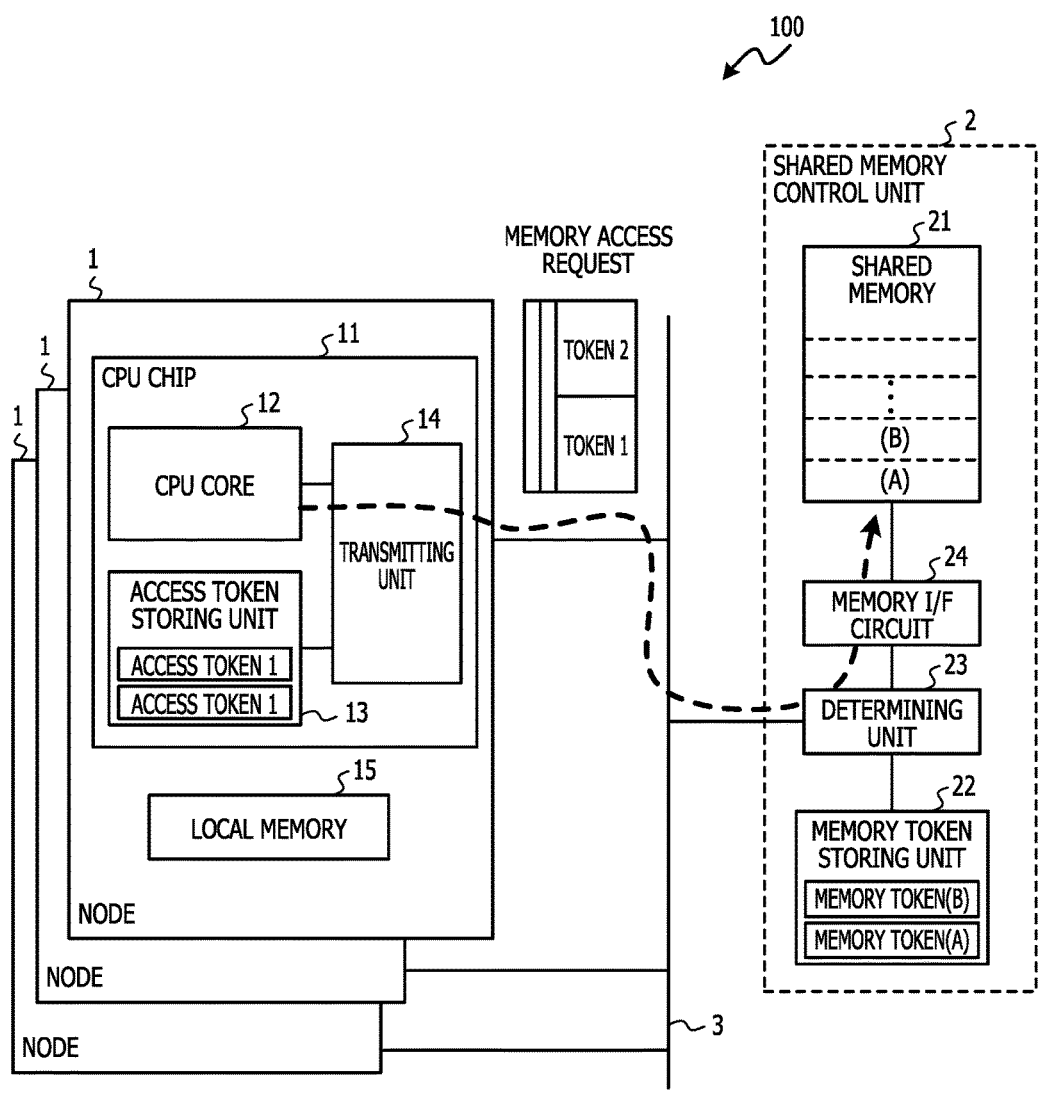
FIG. 1 illustrates an example of a configuration of an information processing system according to a first embodiment.

FIG. 1 illustrates an example of a configuration of an information processing system 100 according to a first embodiment. As illustrated in FIG. 1, the information processing system 100 includes a plurality of nodes 1 and a shared memory control unit 2. Each of the nodes 1 includes a CPU chip 11 and a local memory 15. The CPU chip 11 is hardware that includes a CPU core 12 for conducting arithmetic operations, an access token storing unit 13, and a transmitting unit 14. The local memory 15 is hardware for storing programs and data used for operations executed by the CPU core 12. One or more operating systems (OS) operate by using CPU chip 11 in each nodes 1. Each of the nodes 1 are connected via an interconnect 3 such as a crossbar switch. The interconnect 3 is not limited to a crossbar switch and a local area network (LAN) or an InfiniBand may be used.

While the shared memory control unit 2 is illustrated with a dashed line in FIG. 1, the shared memory control unit 2 may be provided in each node 1 and a shared memory 21 included in the shared memory control unit 2 in each node 1 may be configured as an intra-node shared memory that can be accessed by the plurality of nodes 1. Here, the "intra-node shared memory" refers to a shared memory that can be accessed (read/write) by the plurality of nodes. For example, a system configuration such as a non-uniformed memory access (NUMA) configuration may be established, and the shared memory 21 in each of the shared memory control units may be treated overall as a large shared memory by assigning each shared memory 21 of shared memory unit 2 to separate regions included in a virtual memory map. Further, the shared memory 21 of shared memory control units 2 may be configured as a shared storage device that can be accessed by a plurality of nodes as a system configuration for implementing a first aspect of the embodiments discussed herein.

The shared memory control unit 2 includes a shared memory 21, a memory token storing unit 22, a determining unit 23, and a memory interface (I/F) circuit 24. The shared memory 21 includes a plurality of segments and is a memory shared by the plurality of nodes 1. Here, a "segment" is a unit for managing a shared memory, and a memory token which represents identification information used for controlling access permissions can be set to each segment. The size of the segment can be set to any size for managing a shared memory such as 4 MB, 32 MB, 256 MB, or 2 GB and the like.

The memory token storing unit 22 stores the memory tokens used for controlling access permissions for each segment included in the shared memory. In the example in FIG. 1, the memory token storing unit 22 stores memory tokens (A) and (B) respectively corresponding to segments (A) and (B) included in a shared memory for example. The determining unit 23 is a circuit for determining whether an access to a shared memory is permitted or not by using the memory tokens and information included in a request for accessing a segment included in the shared memory 21. The memory interface (I/F) circuit 24 is a circuit for controlling the access indicated in the request for accessing the shared memory when the determining unit 23 permits an access of a request.

The access token storing unit 13 in the CPU chip 11 is a storing unit for the CPU core 12 to store access tokens which each represent specific access identification information for accessing a specific segment included in the shared memory 21. The access token storing unit 13 stores a plurality of access tokens corresponding to a plurality of segments in the shared memory 21 for accesses scheduled by the CPU core 12.

The transmitting unit 14 adds the plurality of access tokens stored in the access token storing unit 13 to requests for accessing the shared memory 21 issued by the CPU core 12 and transmits the request and the access tokens. Each access token stored in the access token storing unit 13 is an access token corresponding to a segment in a shared memory scheduled to be accessed by an application program executed by the CPU core 12. The access tokens are previously stored by the application program or the operating system (OS) in the access token storing unit 13.

In the present embodiment, when the CPU core 12 accesses a plurality of segments set with different memory tokens, the plurality of access tokens previously stored in the access token storing unit 13 are added to the request and transmitted. The determining unit 23 in the shared memory control unit 2 that is the access target in the request compares the plurality of access tokens included in the request and the memory tokens corresponding to the segment in the request access target. The determining unit 23 permits the access indicated in the request if the memory token retrieved from the memory token storing unit 22 corresponding to the request access target matches any one of the plurality of access tokens included in the request.

The plurality of access tokens previously stored in the access token storing unit 13 are added to each request for accessing the plurality of regions in the shared memory and transmitted, and the plurality of access tokens are compared with the memory token by the determining unit 23 whereby resetting of the access tokens as illustrated in FIG. 22 is made unnecessary. That is, overhead for resetting access tokens can be reduced when accessing a plurality of memory regions set with different memory tokens.

Figure 2:
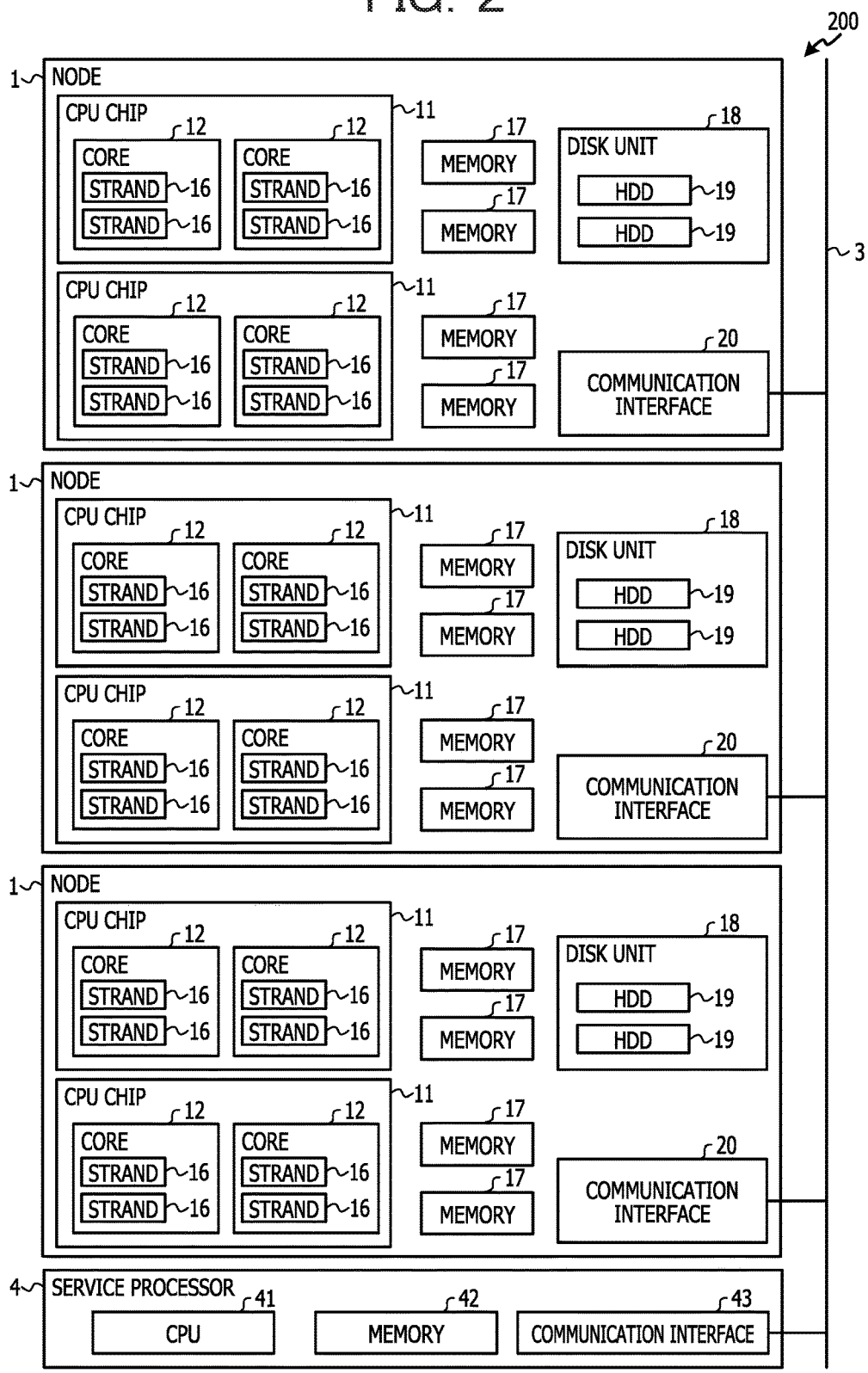
FIG. 2 illustrates an example of a hardware configuration for an information processing system according to the first embodiment.

FIG. 2 illustrates an example of a hardware configuration for an information processing system 200 according to the first embodiment. In the information processing system 200, three nodes 1 are connected to a service processor 4 via the interconnect 3. Each node 1 has two CPU chips 11, four memories 17, a disk unit 18, and a communication interface 20.

The CPU chips 11 each have two CPU cores 12 and each CPU core 12 has two strands 16. The four memories 17 included in each node 1 corresponds to the four CPU cores 12 included in each node 1. The strands 16 are hardware threads to be executed in units of application program processes executed by the CPU core 12.

The memories 17 are random access memories (RAM) for storing programs executed by the CPU cores 12 and data used by the CPU cores 12. The memories 17 include a plurality of memories such as dual inline memory modules (DIMM), and a portion of the plurality of memories can be used as the shared memory 21 that can be accessed from another node and the remainder of the plurality of memories can be used as the local memory 15 for allowing local access by the CPU core 12 corresponding to the other portion of the plurality of memories. Hereinbelow, each memory 17 is assumed to have the local memory 15 and the shared memory 21.

The disk unit 18 is a storage device having, for example, two hard disk drives (HDD) 19. The HDDs 19 are magnetic disc devices. The communication interface 20 is an interface circuit for conducting communication with another node 1 and the service processor 4 via the interconnect 3 such as a crossbar switch.

The service processor 4 is a device for controlling the nodes 1 and has a CPU 41, a memory 42, and a communication interface 43. The CPU 41 performs various processes performed by the service processor 4 by executing programs stored in the memory 42. The memory 42 is a RAM for storing programs executed by the CPU 41 and data used by the CPU 41. The communication interface 43 is an interface circuit for allowing the service processor 4 to communicate with the nodes 1 via the interconnect 3.

Although not illustrated in FIG. 2, each strand 16 for executing the processes for the application programs has the access token storing unit 13 and the transmitting unit 14 discussed with reference to FIG. 1. Moreover, each shared memory 21 included in each memory 17 has the memory token storing unit 22, the determining unit 23, and the memory I/F circuit 24 discussed with reference to FIG. 1. The access token storing unit 13 may be provided in each CPU core 12 when application program processing is executed by units of CPU cores 12. By providing the access token storing unit 13 in each strand 16 and in each CPU core 12, memory access control can be performed for each process of the application program.

The memories 17 in each node 1 includes the shared memory 21, and the shared memory 21 in each node 1 is configured to act as an intra-node shared memory that can be accessed by the CPU chip 11 in another node in the information processing system 200. Each node 1 in the information processing system 200 may also be called a building block.

A node having a physical memory set as a memory region to be shared between nodes is called a "home node," and another node that refers to the shared memory of the home node is called a "remote node" in the information processing system 200 having intra-node shared memories.

Each node 1 in the information processing system 200 stores a memory token for controlling access from another node 1 to the shared memory inside the own node (home node), in the memory token storing unit 22 in the own node. The home node issues notification of a token corresponding to the memory token of the segment to the other node accessing the segment of the shared memory in the own node. The remote node holds the token received from the home node and uses the token as an access token when accessing the segment of the home node corresponding to the token.

Because the information processing system 200 has the memory configuration of the intra-node shared memories, the strands 16 included in each node 1 are able to access the shared memory in another node 1 in addition to being able to access the shared memory in the own node. The strands 16 access the shared memories by adding, to each request, the plurality of access tokens including the access token corresponding to the segment of the shared memory that is the access target and transmitting the plurality of access tokens with the request when accessing the shared memory.

The determining unit 23 provided in each shared memory 21 of the home node controls permissions for accesses indicated in the requests in response to whether any of the plurality of access tokens added to the request corresponds to the memory token of the segment the request is attempting to access.

While the system configuration in FIG. 2 includes three nodes 1 for facilitating the explanation, a system having any number of nodes may be used. The number of the CPU cores 12 included in the CPU chip 11 and the number of the strands 16 included in the CPU cores 12 may be set to any number. Further, the number of memories 17 and the number of HDDs 19 included in the disk unit 18 may be set to any number.

Figure 3:
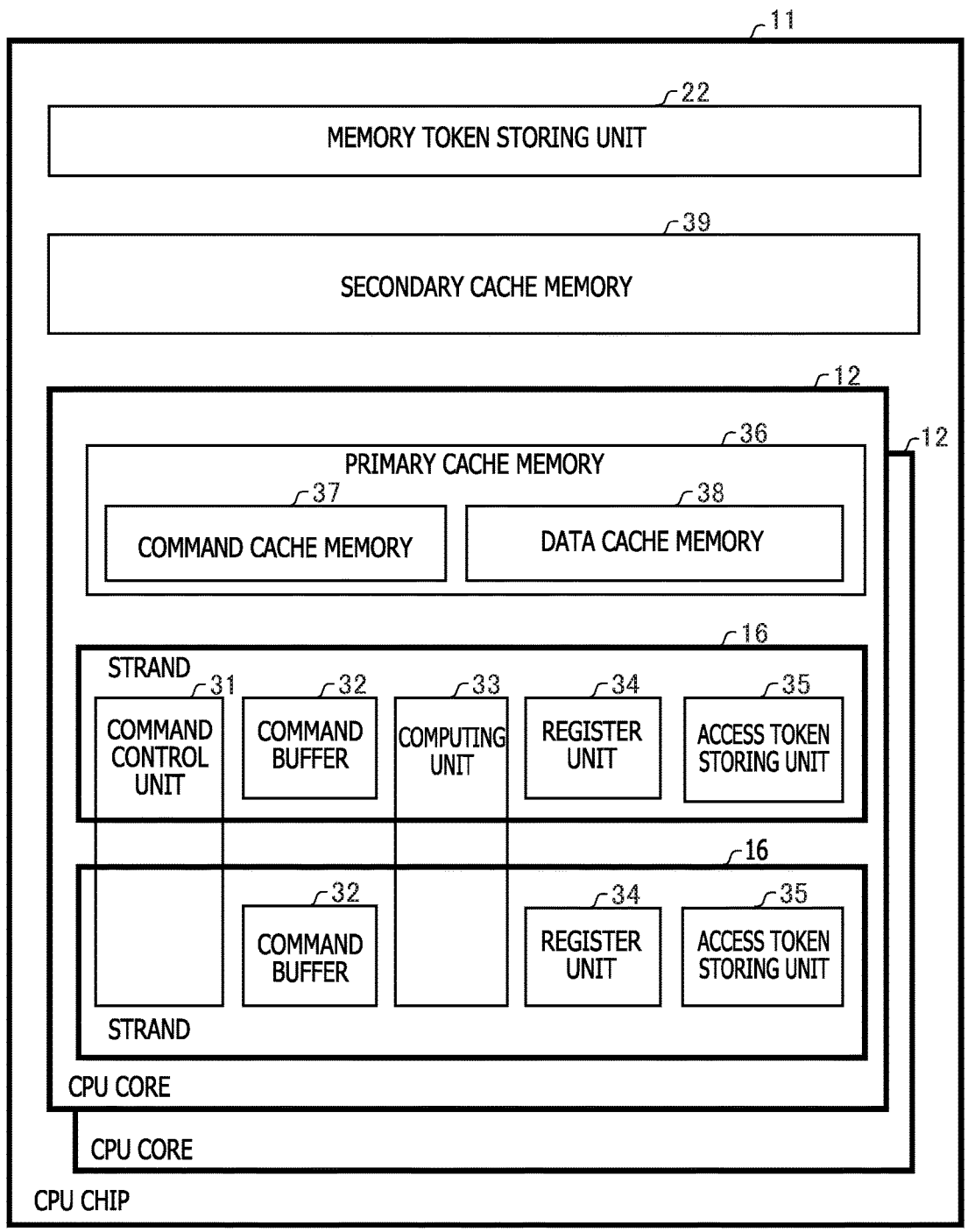
FIG. 3 illustrates an example of a configuration of a CPU chip.

FIG. 3 illustrates an example of a block diagram of the CPU chip 11 in FIG. 2. The CPU chip 11 has the two CPU cores 12, the memory token storing unit 22, and a secondary cache memory 39. While not illustrated in FIG. 3, the CPU chip 11 is provided with the determining unit 23 for allowing each CPU core 12 to access the memories 17, and the memory I/F circuit 24 for controlling the read/write of the shared memory 21. Each CPU core 12 has a primary cache memory 36 and the strands 16.

The memory token storing unit 22 stores memory tokens corresponding to the segments included in the shared memories 21 included in the memories 17. The plurality of memory tokens stored in the memory token storing unit 22 respectively correspond to the plurality of segments scheduled to be used by the application program executed by the CPU core 12.

The secondary cache memory 39 is a large capacity cache memory having a lower speed compared to the primary cache memory 36 in the CPU core 12. The primary cache memory 36 is a small capacity cache memory having a higher speed compared to the secondary cache memory 39. The primary cache memory 36 has a command cache memory 37 and a data cache memory 38. The command cache memory 37 temporarily stores command codes retrieved from the memories 17 or the disk unit 18. The data cache memory 38 temporarily stores data retrieved from the memories 17 or the disk unit 18.

The strands 16 each have a command control unit 31, a command buffer 32, a computing unit 33, a register unit 34, and an access token storing unit 35. As illustrated in FIG. 3, the command control unit 31 and the computing unit 33 may be installed as shared hardware resources to be shared among the plurality of strands 16.

The command control unit 31 retrieves commands from the command buffer 32 and controls the execution of the retrieved commands. The command buffer 32 stores the commands retrieved from the command cache memory 37. The computing unit 33 executes computing such as basic arithmetic operations. The register unit 34 has a general purpose register for storing data used in executing the commands, and various types of status registers.

The access token storing unit 35 stores, in association with the strands 16, a plurality of access tokens for accessing the segments of the shared memory 21 set with the memory tokens. The transmitting unit which adds the plurality of access tokens stored in the access token storing unit 35 to requests issued by the strands 16 and transmits the access tokens with the requests, is omitted in FIG. 3.

Figure 4A:
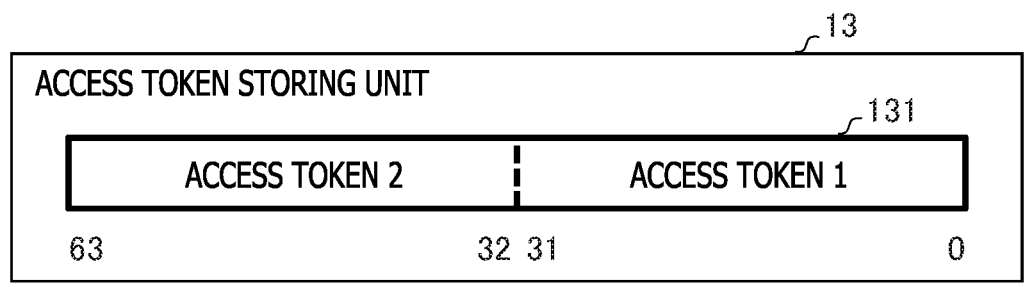
FIG. 4A illustrates an example of storing two tokens in one register as an example of a configuration of an access token storing unit.
Figure 4B:
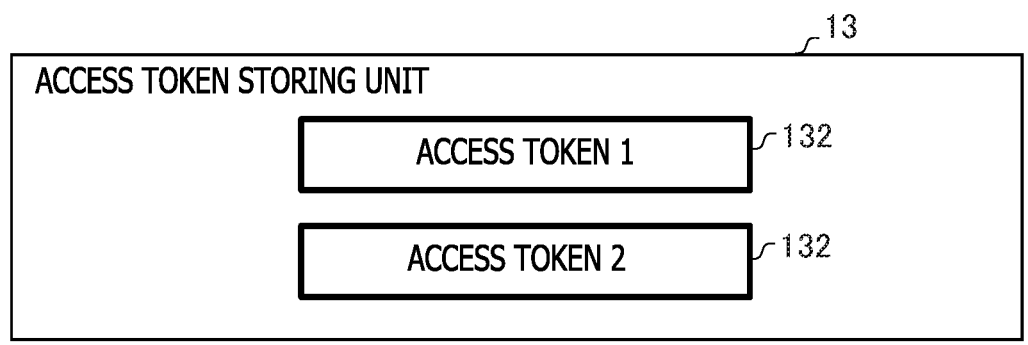
FIG. 4B illustrates an example of storing tokens in a plurality of registers as an example of a configuration of an access token storing unit.
Figure 4C:
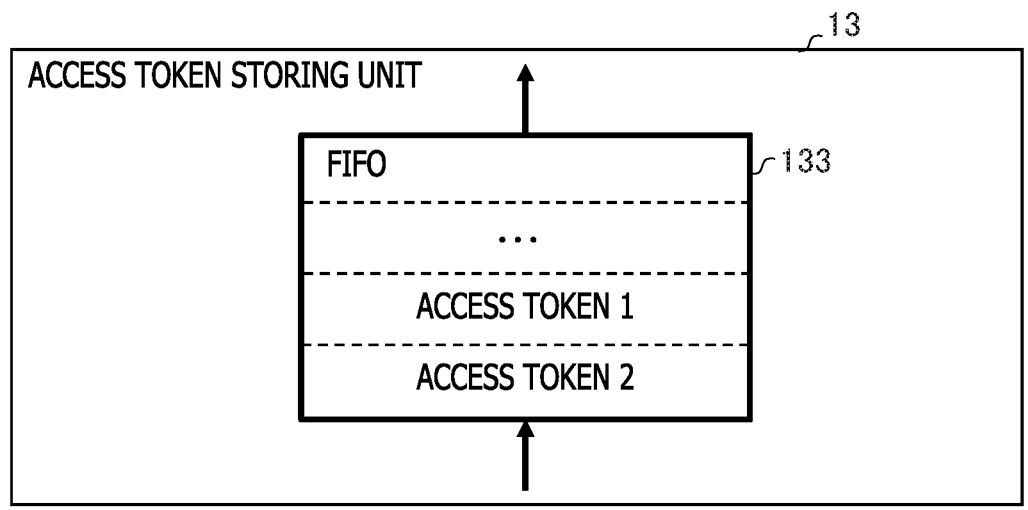
FIG. 4C illustrates an example of storing tokens in a FIFO as an example of a configuration of an access token storing unit.

FIGS. 4A, 4B, and 4C illustrate examples of several configurations of the access token storing unit 13. The access token storing unit 13 illustrated as an example in FIG. 4A has one 64-bit access token register 131, stores an access token 1 in bits 31 to 0, and stores an access token 2 in bits 63 to 32. While two access tokens are stored in one access token register 131 in the example illustrated in FIG. 4A, a larger number of access tokens may be stored in one register.

The access token storing unit 13 illustrated as an example in FIG. 4B has a plurality of access token registers 132 which each store one access token. In the example in FIG. 4B, the number of access token registers 132 is merely the number of access tokens scheduled to be stored. By providing a plurality of registers for storing access tokens that can be updated with a software program, the access tokens can be updated by the software program according to any rule.

The access token storing unit 13 illustrated as an example in FIG. 4C uses a first-in-first-out (FIFO) buffer 133 to a store a plurality of access tokens. By storing the access tokens in the FIFO buffer 133, the oldest access tokens are automatically erased and new access tokens are added when updating the access tokens.

Figure 5:
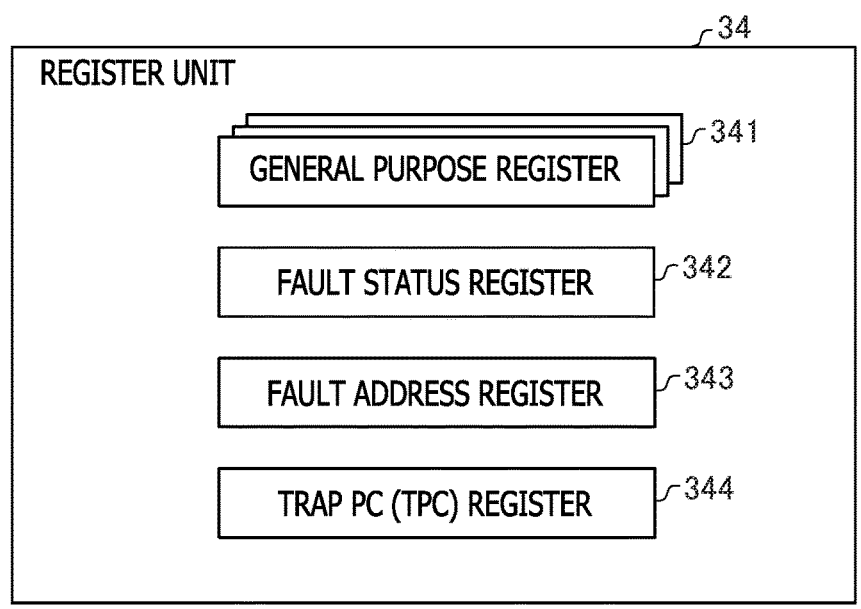
FIG. 5 illustrates an example of a configuration of a register unit.

FIG. 5 illustrates an example of a configuration of the register unit 34. The register unit 34 includes a plurality of general purpose registers 341, a fault status register 342, a fault address register 343, and a trap PC (TPC) register 344.

The general purpose registers 341 are general purpose registers used when executing load commands, store commands, and various types of commands in the strand 16. The fault status register 342 is a register for storing statuses when an exception is generated. The fault address register 343 is a register for storing an access target address for a memory access in which an exception is generated when an exception is generated during the memory access. The TPC register 344 is a register for storing a program counter (PC) when an exception is generated.

Figure 6:
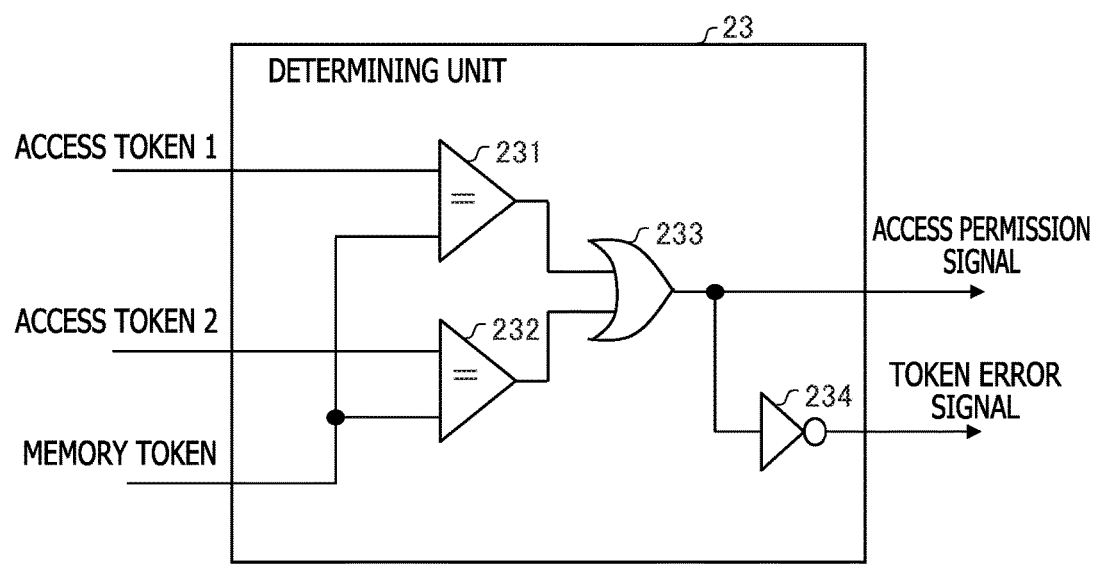
FIG. 6 illustrates an example of a configuration of a determining unit.

FIG. 6 illustrates an example of a configuration of the determining unit 23. The determining unit 23 determines whether to permit a memory access indicated in a request according to whether any of the plurality of access tokens included in the request for accessing the shared memory corresponds to the memory token corresponding to the access target of the request.

The determining unit 23 includes comparators 231 and 232, an OR circuit 233, and an inverter circuit 234. The comparators 231 are circuits that compare the access token 1 included in the request and the memory token retrieved from the memory token storing unit 22, and if the tokens match, output a high level signal. The comparator 232 is a circuit that compares the access token 2 included in the request and the memory token retrieved from the memory token storing unit 22, and if the tokens match, outputs a high level signal.

The OR circuit 233 is an OR circuit that outputs a high level signal if either of the output signals from the comparator 231 and the comparator 232 is a high level signal. The output of the OR circuit 233 is sent to the memory I/F circuit 24 as an access permission signal. The memory I/F circuit 24 executes accesses to the shared memory in the request if the access permission signal is a high level signal.

The inverter circuit 234, for example, inverts the access permission signal outputted from the OR circuit 233 and outputs the access permission signal as a token error signal. The token error signal is used, for example, as an error reply with regard to the request or as a signal for generating an exception for the CPU core that issued the request.

Figure 7:
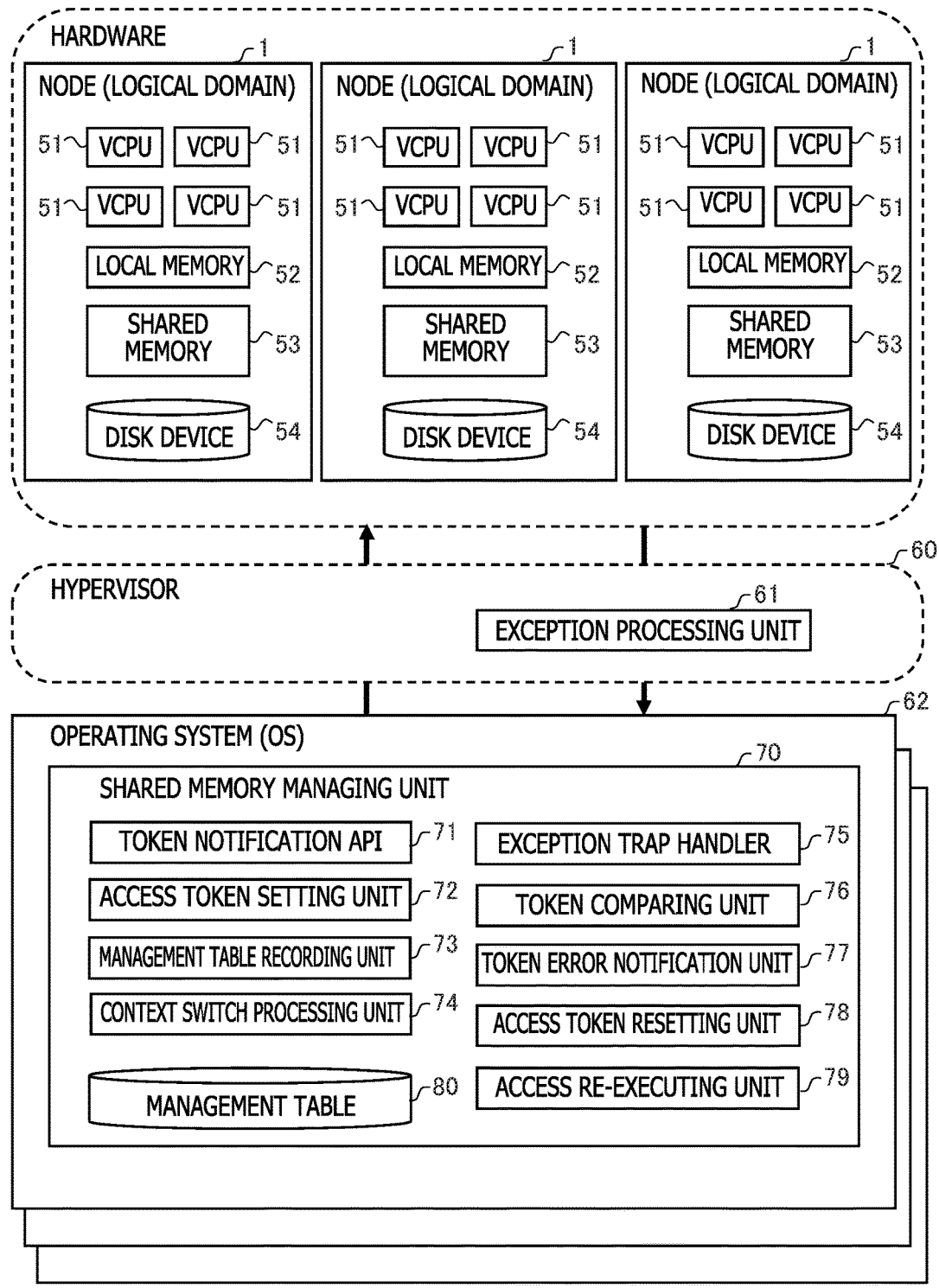
FIG. 7 illustrates an example of a functional configuration of software and a logical configuration of hardware for the information processing system according to the first embodiment.

FIG. 7 illustrates an example of a functional configuration of software and a logical configuration of hardware for the information processing system according to the first embodiment. The logical configuration of hardware is a logical hardware configuration used by an OS or application executed by the CPU chip 11. FIG. 7 illustrates an example in which one node 1 is set as one logical domain. Moreover, one OS, for example, is executed in one logical domain.

The logical configuration of hardware in FIG. 7 is illustrated in the portion enclosed by the upper dashed line. The node 1 has virtual CPUs (VCPU) 51, a local memory 52, a shared memory 53, and a disk device 54 as logical resources of the hardware. The VCPUs 51 are logical CPUs and correspond to any of the eight strands 16 illustrated in FIG. 2.

While each VCPU 51 performs memory access using a logical address (VA), the logical addresses (VA) are converted to real addresses (RA) or physical addresses (PA) by an unillustrated address converting mechanism, and access to the shared memory is performed. Here, a "physical address (PA)" is an address assigned to a physical position in the memory, and a "real address (RA)" is an address assigned to each logical domain in a system provided with virtual functions.

The local memory 52 is a memory that can only be accessed by the CPU core 12 in each node, and the shared memory 53 is a memory that can be accessed by another node 1. The local memory 52 and the shared memory 53 respectively correspond to the local memory 15 and the shared memory 21 included in the memories 17 illustrated in FIG. 2. The disk device 54 corresponds to the disk unit 18 illustrated in FIG. 2.

A hypervisor 60 and an operating system (OS) 62 are included as software functional configurations in FIG. 7.

The hypervisor 60 is basic software that manages physical resources for the information processing system 200 and provides logical resources to the OS 62, and has an exception processing unit 61 as one function thereof.

The exception processing unit 61 issues notification of an exception generated during processing that uses the physical resources of the information processing system 200, to the OS 62 of the node 1 that executed the processing. The exception processing unit 61 also issues the notification along with information pertaining to the processing that generated the exception. For example, when an exception of a token mismatch is generated during processing to access a shared memory, the exception processing unit 61 also issues notification of information which indicates that the type of exception is a token mismatch exception and the information of the address where the exception was generated.

The OS 62 uses the logical resources to control the execution of application programs. The OS 62 includes a shared memory managing unit 70. The shared memory managing unit 70 manages the shared memories 53 and has a token notification API 71, an access token setting unit 72, a management table recording unit 73, a context switch processing unit 74, an exception trap handler 75, a token comparing unit 76, a token error notification unit 77, an access token resetting unit 78, an access re-executing unit 79, and a management table 80.

The functions of the hypervisor 60 and the respective functions of the token notification API 71, the access token setting unit 72, the management table recording unit 73, the context switch processing unit 74, the exception trap handler 75, the token comparing unit 76, the token error notification unit 77, the access token resetting unit 78, and the access re-executing unit 79 included in the OS 62 and the shared memory managing unit 70 are executed by using the hardware resources such as the CPU chip 11 and the memories 17 in each node of the information processing system 200.

The token notification API 71 is an application programming interface (API) unit for issuing, to the OS 62, notification of tokens corresponding to segments of the shared memories which are scheduled by the application program to be used by the program itself (simply referred to below as "token"). Application programs executed by the VCPUs 51 use the token notification API 71 to issue, to the OS 62, notification of tokens corresponding to segments of the shared memories scheduled to be used by the program itself. The timing for issuing, to the OS 62, the notification of the access tokens corresponding to the segments in the shared memories which the application program attempts to access is explained below with reference to FIG. 10.

The access token setting unit 72 sets the access tokens notified by the application program using the token notification API 71, in the access token storing unit 35. The access token setting unit 72 performs the setting in the access token storing unit 35 so that the setting values of new access tokens remain longer than those of the oldest access tokens when a plurality of access tokens are already set in the access token storing unit 35 while setting the access tokens. The setting processing of the access tokens by the access token setting unit 72 is described below with reference to FIGS. 11 to 13.

The management table recording unit 73 stores the access tokens notified with the token notification API 71 by the application program, in the management table 80. The management table 80 is a table that is provided in each node 1 and that stores information of the shared memory 53 in each segment with regard to all of the shared memories 53 in the information processing system 200 including the shared memories 53 in other nodes 1. The management table 80 is kept in a specific region inside the local memory 52 for example.

The application program may request the setting of more access tokens than the number of access tokens that can be set in the access token storing unit 35. In such a case, the management table recording unit 73 records all of the access tokens notified by the token notification API 71 in the management table 80 provided in each node 1.

An example of the management table 80 is discussed below with reference to FIG. 8. The processing for storing access tokens in a management table by the management table recording unit 73 is discussed below with reference to FIGS. 11 to 13.

The context switch processing unit 74 conducts processing to save and recover information stored in the registers during a context switch in which the processing of the application program being executed in the strand 16 in the CPU core 12 is changed. Specifically, the context switch processing unit 74 uses a save area previously provided in each thread of a process for saving and recovering the information stored in the access token storing unit 35 or the register unit 34. Due to the context switch processing unit 74 carrying out the context switch as well as the processing of the information of the access tokens stored in the access token storing unit 35, the setting values of the newest access tokens set in each thread in the processing can be passed on even if a context switch is generated. Processing by the context switch processing unit 74 is discussed in detail below with reference to FIG. 14.

The exception trap handler 75 performs exception processing when an exception is generated during application program processing executed in the strands 16. The exception trap handler 75 hands over processing to a processing unit for performing the exception processing with regard to the exception in response to the contents of the exception that was generated, to cause the desired exception processing to be executed.

For example, if the application program attempts to access (loading or storing) the shared memory 53, a token mismatch exception trap is generated if any of the plurality of access tokens included in the request for conducting the access do not match the memory token.

More specifically, the determining unit 23 for determining the access to the shared memory 53 that is the access target issues an error reply based on the token mismatch with regard to the request if the memory token corresponding to the segment that is the access target in the request does not match any of the plurality of access tokens included in the request.

The hardware resource such as the communication interface 20 in the node 1 that issued the request generates the exception due to the token mismatch upon receiving the error reply corresponding to the request. When the exception is generated by the hardware resource due to the token mismatch, the processing unit 61 in the hypervisor 60 issues notification of a token mismatch exception trap to the OS 62.

The exception trap handler 75 in the OS 62 first reads the fault status register 342 and determines whether the cause of the trap is based on a token mismatch upon receiving the exception trap from the processing unit 61 of the hypervisor 60. If the trap cause is based on a token mismatch, the exception trap handler 75 causes the token comparing unit 76, the access token resetting unit 78, and the access re-executing unit 79 which execute the belowmentioned token mismatch exception processing to execute the exception processing.

When a token mismatch exception trap is generated, various types of information pertaining to the exception trap are recorded in the registers included in the register unit 34 of the strand 16 that performs the exception processing. For example, information indicating the cause related to the generation of the token mismatch exception trap is recorded in the fault status register 342 as the information to be recorded in the register unit 34 when a token mismatch exception trap is generated. Information about the fault address which is the address of the access (loading or storing) attempted by the request in which the token mismatch exception trap is generated, is recorded in the fault address register 343. Moreover, the value of a program counter (PC) of the command for attempting to execute the request that led to the generation of the token mismatch exception trap, is recorded in the TPC register 344.

The belowmentioned token comparing unit 76 and the access token resetting unit 78 refer to the information recorded in the register unit 34 to obtain information such as the cause or the address of the access target when the exception trap is generated, and the PC value of the command that executed the request that generated the exception trap. The processing is explained in detail with reference to FIGS. 15 to 17.

The token comparing unit 76 compares the token designated from the application program by the token notification API 71 with the plurality of access tokens stored in the access token storing unit 35. The token comparing unit 76 invoked by the exception trap handler 75 conducts the following processing.

The token comparing unit 76 first reads the fault address register 343 and obtains the information of the fault address in which the token mismatch exception trap is generated. The token comparing unit 76 specifies the segment of the shared memory that the application attempted to access from the obtained fault address information and the information stored in the management table 80, and obtains the value of the token of the specified segment from the management table 80. The value of the token obtained from the management table 80 is a value of the token designated by the application program with the token notification API 71, and is a token for storing in the access token storing unit 35 when accessing the shared memory.

As described above, the number of tokens notified by the application program through the token notification API 71 may be higher than the number of access tokens stored in the access token storing unit 35. In this case, the access tokens to be added to and transmitted with the request for accessing the shared memory may not be stored in the access token storing unit 35.

Therefore, the token comparing unit 76 compares the plurality of access tokens stored in the access token storing unit 35 with the tokens stored in the management table 80 corresponding to the segment of the shared memory that the request which generated the exception attempts to access. According to the result of the comparison, processing by the belowmentioned token error notification unit 77 or the access token resetting unit 78 is executed. The processing of the token comparing unit 76 is explained in detail with reference to FIGS. 15 to 17.

The token error notification unit 77 is an API for issuing notification of a signal indicating that there is a token setting error to the application program. The token error notification unit 77 issues, to the application program, notification of a signal indicating that the token is not set yet if the token corresponding to the specific segment retrieved from the management table 80 is "0", that is if the token corresponding to the segment is not set yet.

The token error notification unit 77 issues notification of a token mismatch signal to the application program when, as a result of the comparison by the token comparing unit 76, the token obtained from the management table 80 matches any one of the plurality of access tokens stored in the access token storing unit 35.

A token setting error occurs when the token mismatch exception trap is received while any of the plurality of access tokens stored in the access token storing unit 35 matches the token notified by the application program with the token notification API 71. That is, because the token mismatch exception trap is generated regardless of whether or not the token notified with the token notification API 71 is set correctly in the access token storing unit 35, there is a problem with the token notified by the token notification API 71.

In this case, the memory token of the home node does not correspond to the token set by the application program with the home node or the remote node, and thus the token error notification unit 77 issues notification of the token mismatch signal to the application program. The token mismatch signal may include the fault address in which the token mismatch exception trap is generated and the trap PC information.

The access token resetting unit 78 resets the access token storing unit 35 when, as a result of the comparison by the token comparing unit 76, the token obtained from the management table 80 does not match any of the plurality of access tokens stored in the access token storing unit 35. During the resetting, the access token resetting unit 78 retrieves, from the management table 80, the token corresponding to the shared memory segment that the request which generated the token mismatch exception trap was trying to access, and resets the token in the access token storing unit 35.

When resetting the token in the access token storing unit 35, the access token resetting unit 78 performs the setting in the access token storing unit 35 so that the setting values of the new access tokens remain longer than those of the oldest access tokens among the plurality of access tokens are already set in the access token storing unit 35. The access token resetting process carried out by the access token resetting unit 78 is described below with reference to FIGS. 15 to 17.

After the access token has been reset by the access token resetting unit 78, the access re-executing unit 79 uses the reset token to re-execute the access to the access target in which the token mismatch exception trap is generated. Because the reset access token matches the memory token corresponding to the segment of the access target so long as no token setting mistake has occurred, the re-executed memory access is carried out normally. The processing by the access re-executing unit 79 is described below with reference to FIGS. 15 to 17.

FIG. 8 illustrates an example of the management table 80 in a segment of a shared memory created for each node. FIG. 8 illustrates an example of a management table 80-0 in a node 0 with a node number of "0", an example of a management table 80-1 in the node 1 with a node number of "1", and an example of a management table 80-2 in a node 2 with a node number of "2". In the examples, the node 0 and the node 1 are home nodes and the node 2 is a remote node.

The segments with segment numbers "0" to "4" are segments having shared memories with the node 0 being the home node, and segments with segment numbers "16" to "20" are segments having shared memories with the node 1 being the home node in FIG. 8. In this case, the management table 80-0 illustrated in FIG. 8 is a management table in the segment in the shared memory 53 in the node 0, and the management table 80-1 is a management table in the segment in the shared memory 53 in the node 1. The management table 80-2 is a management table with segments "0" to "4" and "16" to "20" in the node 2 which is the remote node.

As illustrated in FIG. 8, the management table 80 stores segment numbers, addresses, segment sizes, usage permission node numbers, PIDs of applications in use, and tokens.

The segment numbers are identification numbers for identifying a segment included in the shared memory 53. The addresses indicate head addresses of a physical address (PA) of the segment. The addresses may be real addresses if real addresses (RA) are used in the information processing system.

The segment size indicates the size of a segment. The usage permission node numbers are used only by the management table 80 in the home node and are numbers of the nodes 1 that are permitted to use the segment. The PIDs of the applications in use are process IDs of the application programs that use the segment in the own node.

The tokens include memory tokens for the home node segments and include access tokens for the remote node segments. That is, the tokens of the segments "0" to "4" and "16" to "20" in the management tables 80-0 and 80-1 in FIG. 8 are memory tokens, and the tokens of the segments corresponding to the management table 80-2 are access tokens.

For example, the segment having the identification number "0" in the management table 80-0 in the node 0 has a PA of "000000000" as a hexadecimal and a size of "256" MB, and the numbers of the nodes that are permitted to use the segment are "0" and "2". The segment having the segment number "0" is used by the processes having the process IDs of "123" and "456" in the node 0 that is the home node, and the memory token is "123" as a hexadecimal.

Meanwhile, the segment with the segment number "0" in the management table 80-2 in the node 2 stores the same address and segment size information as the management table 80-0. However, the node 2 is not a home node and thus the segment number does not have the usage permission node number of "0" and the segment "0" is used in the processes having the process IDs "321" and "654" in the node 2 which is the remote node. Moreover, because the node 2 is the remote node, the access token is stored as "123" as a hexadecimal.

While only segment numbers for the above explanation are depicted as examples in FIG. 8, each of the management tables 80 in the nodes may store information corresponding to the segment numbers of the shared memories for all the nodes.

An outline of an information processing method by the information processing system 200 will be discussed next with reference to FIGS. 9 and 10.

Figure 9:
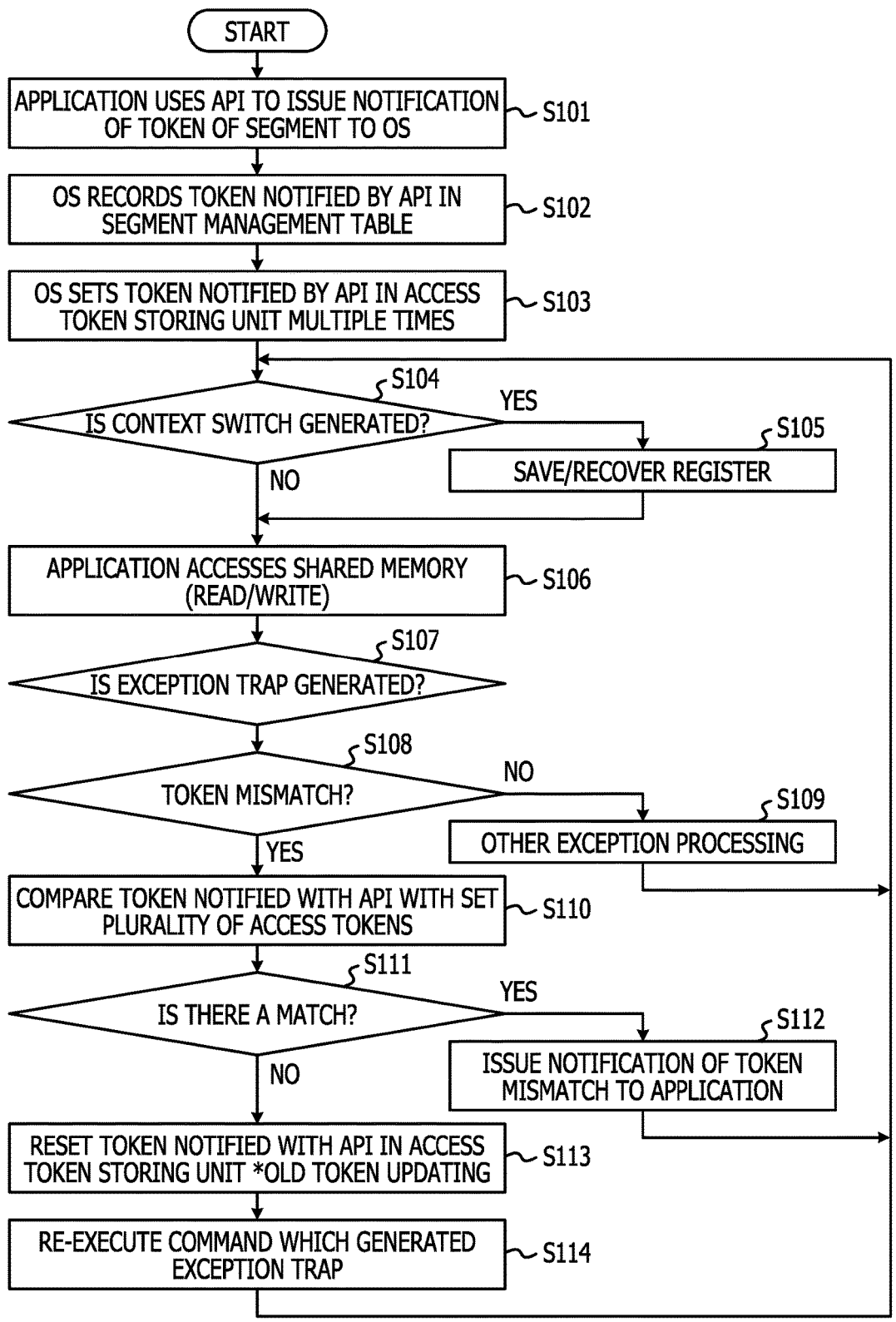
FIG. 9 is a flow chart illustrating an outline of exception trap processing during a shared memory access using an access token according to the first embodiment.

FIG. 9 is a flow chart illustrating an outline of processing during a shared memory access using a plurality of access tokens according to the first embodiment. First, the application program uses the token notification API 71 to issue, to the OS 62, notification of the tokens of the segments of the shared memories scheduled to be used by the application program (S101).

The OS 62 records the tokens notified by the token notification API 71 in the management table 80 (S102). The OS 62 sets the tokens notified by the token notification API 71 in the access token storing unit 35 a multiple number of times (S103).

Next, the processing by the application program is carried out while using the shared memories. If a context switch for changing the process is generated at this time (S104 Yes), the value of the register desired for the processing including the register of the access token storing unit 35 is saved and the information of the register of the switching target process is recovered (S105). If no context switch occurs (S104 No), the application program carries out the processing while accessing the shared memory (S106). The processing using the shared memories by the application program is continued so long as no exception trap is generated (S107 No).

If an exception trap is generated during the shared memory access by the application program (S107 Yes), the OS 62 obtains information about the cause of the exception that generated the exception trap (S108). If the cause of the exception that generated the exception trap is a token mismatch, the processing advances to step S110, and if the cause is not a token mismatch, other exception processing is carried out (S109).

In step S110, the OS 62 specifies the segment corresponding to the address of the access target indicated in the request for performing the shared memory access that generated the token mismatch exception trap. The OS 62 then obtains the token set to the specified segment from the management table 80. The values of all the tokens notified by the token notification API 71 are stored in the management table 80.

The OS 62 compares the value of the token obtained from the management table 80 with the values of the plurality of access tokens stored in the access token storing unit 35 (S110). If the value of the token obtained from the management table 80 matches at least one of the plurality of access tokens stored in the access token storing unit 35 (S111 Yes), there is a problem with the setting of the token by the application program. That is, if an exception trap due to a token mismatch is generated while the access tokens are set correctly, the memory token set in the segment of the access target does not correspond to the token set by the application program. In this case, the OS 62 issues a notification to the application program indicating that the token notified using the token notification API 71 does not match the memory token (S112).

If the token obtained from the management table 80 does not match any of the plurality of access tokens stored in the access token storing unit 35 (S111 No), the OS 62 sets the token obtained from the management table 80 to the access token storing unit 35 (S113). During the resetting of the access token storing unit 35, the OS 62 erases the oldest access token and sets the token obtained from the management table 80 (S113).

The OS 62 then re-executes the access of the shared memory for which the token mismatch exception trap is generated (S114). In this case, the request for accessing the shared memory is executed normally because the token corresponding to the segment of the shared memory that is the access target is added to the request as an access token and transmitted.

At least two access tokens are added to a request and transmitted in the present embodiment, and the plurality of access tokens and the memory token are compared and access is permitted whereby access control can be performed efficiently. For example, even if the data transfer from the segment A to the segment B is performed as depicted in FIG. 22, the access tokens are only reset up to a maximum of two times if the token mismatch exception trap processing (S110 to S114) illustrated in FIG. 9 is performed, and the memory can be accessed normally thereafter.

Figure 10:
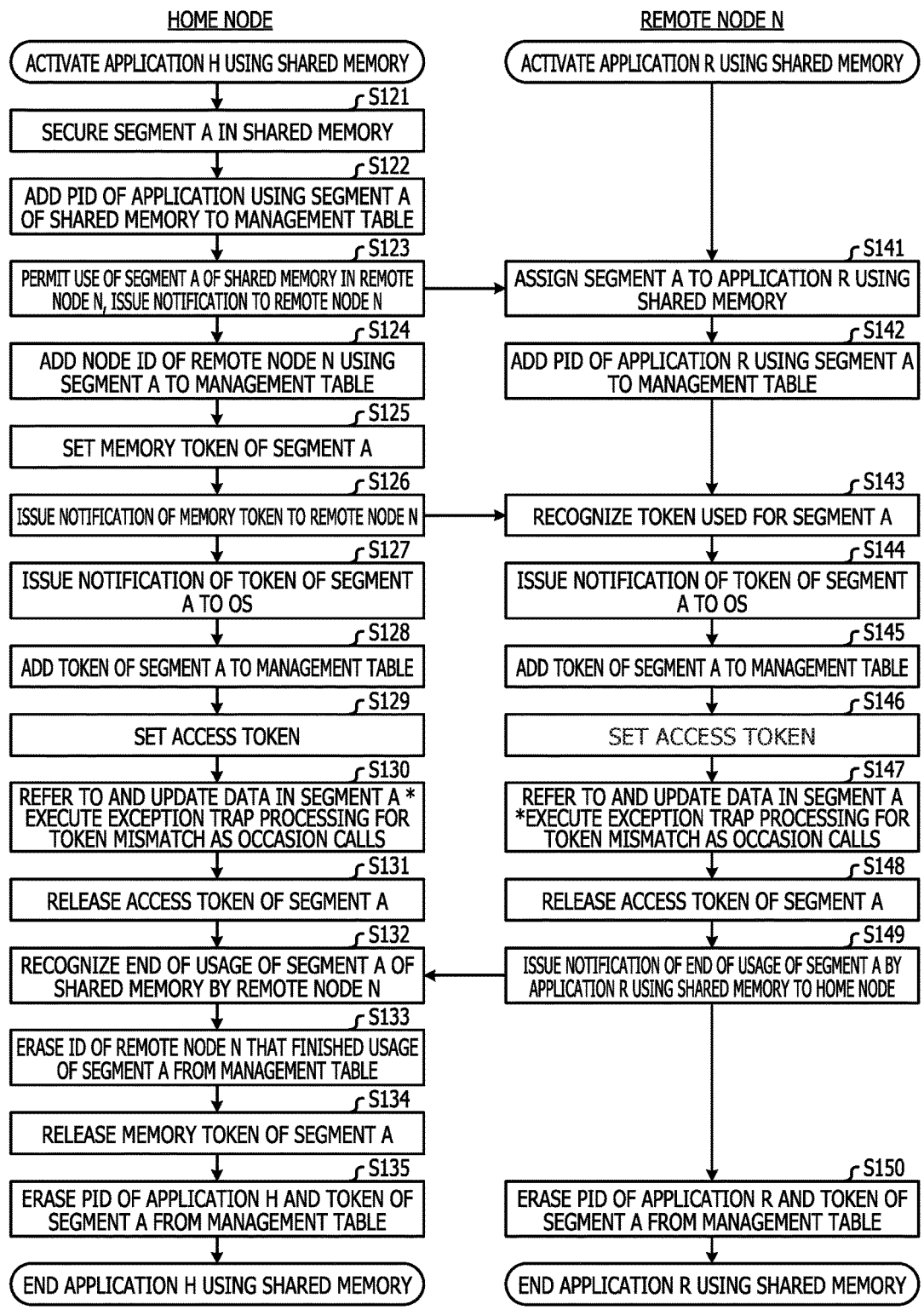
FIG. 10 is a flow chart illustrating an example of processing when an application program accesses a shared memory using an access token in a plurality of nodes.

FIG. 10 is a flow chart illustrating an example of processing when an application program accesses a shared memory using an access token in a plurality of nodes in the information processing system 200 having an intra-node shared memory configuration. In the examples illustrated in FIG. 10, an application program H for using a shared memory is activated in the home node, and an application program R for using a shared memory is activated in a remote node N.

First, the application program H (referred to below as "program H") activated in the home node secures the segment A of the shared memory to be used by the program H itself (S121). When the program H secures the segment A, the OS 62 adds, to the management table 80, a process ID (PID) of the program H that uses the segment A (S122).

If an application program R (referred to below as "program R") executed by the remote node N is permitted to use the segment A, the program H is permitted to use the segment A in the remote node N and issues notification to the remote node N (S123).

The remote node N that receives the notification of the permission to use the segment A in the home node assigns the segment A of the shared memory to the program R (S141). The OS 62 in the remote node N adds the PID of the program R that uses the segment A to the information of the segment A in the management table 80 of the remote node N (S142).

The program H receives the fact that the use of the segment A is permitted by the program R, and the OS 62 of the home node adds the node ID of the remote node N that uses the segment A to the management table 80 (S124). The OS 62 of the home node sets the memory token of segment A to the memory token storing unit 22 (S125). Next, the program H of the home node issues notification of the token corresponding to the memory token set in the segment A to the program R operated by the remote node N (S126).

The program R of the remote node N receives the notification of the token from the program H and recognizes the token for the segment A (S143). The program R then issues notification of the token for the segment A to the OS 62 of the remote node N (S144). The OS 62 of the remote node N adds the token of the segment A notified by the program R to the management table 80 of the remote node N (S145) and sets the token of the segment A in the access token storing unit 35 of the remote node N (S146).

Meanwhile, the program H of the home node issues notification of the token corresponding to the memory token of the segment A to the OS 62 of the home node (S127). The OS 62 of the home node adds the token of the segment A notified by the program H to the management table 80 of the home node (S128) and sets the token of the segment A in the access token storing unit 35 of the home node (S129).

Next, the program H of the home node performs processing to refer to or update the data of the segment A in the processing performed by the program H (S130). Moreover, the program R in the remote node N performs processing to refer to or update the data of the segment A in the processing performed by the program R (S147).

While the example illustrated in FIG. 10 discusses a case in which the program H of the home node and the program R of the remote node N both use the segment A of the shared memory, generally the program H and the program R use a plurality of segments. If the number of segments used by the program H and the program R is greater than the number of access tokens that can be set in the access token storing unit 35 in each of the nodes, a token mismatch exception trap is generated in the access targets of the programs R and H. That is, the token mismatch exception trap is generated if the access tokens set in steps S129 and S146 do not match the memory token corresponding to the segment being accessed by the programs H and R. In this case, the OS 62 in the node in which the token mismatch exception trap is generated executes the following exception trap exception processing and updates the access tokens (S130, S147).

When the program H in the home node and the program R in the remote node N complete the processing using the segment A and the segment A is no longer being used, the programs H and R in the respective nodes instruct the release of the access tokens of the segment A (S131, S148) to the OS 62 of the nodes. The program R of the remote node N issues notification of the end of the usage of the segment A to the home node (S149).

The home node receives the notification from the remote node N and recognizes the end of the usage of the segment A by the remote node N (S132). The OS 62 of the home node erases the node ID of the remote node N that finished the usage of the segment A from the management table 80 (S133). The OS 62 of the home node further erases the setting of the memory token of the segment A recorded in the memory token storing unit 22 of the home node (S134).

Next, the OS 62 of the home node erases the PID of the program H and the token of the segment A from the management table 80 of the home node (S135) and ends the program H. Moreover, the OS 62 of the remote node N erases the PID of the program R and the token of the segment A from the management table 80 of the remote node (S150) and ends the program R.

As explained above, there is a high possibility that the number of segments of the shared memory scheduled to be used by an application program may be greater than the number of access tokens that can be set in the access token storing unit 35. In such a case, setting a token each time an application program accesses a shared memory is not efficient for the operation of the program. As a result, after the application program first issues notification of a plurality of tokens to the OS 62, the application program preferably accesses the shared memory without recognizing the tokens.

According to the present embodiment, after the application program first issues notification of the tokens to the OS 62, the shared memory managing unit 70 of the OS 62 automatically resets the access tokens whereby the application program is able to access the shared memory without recognizing the tokens.

Figure 11:
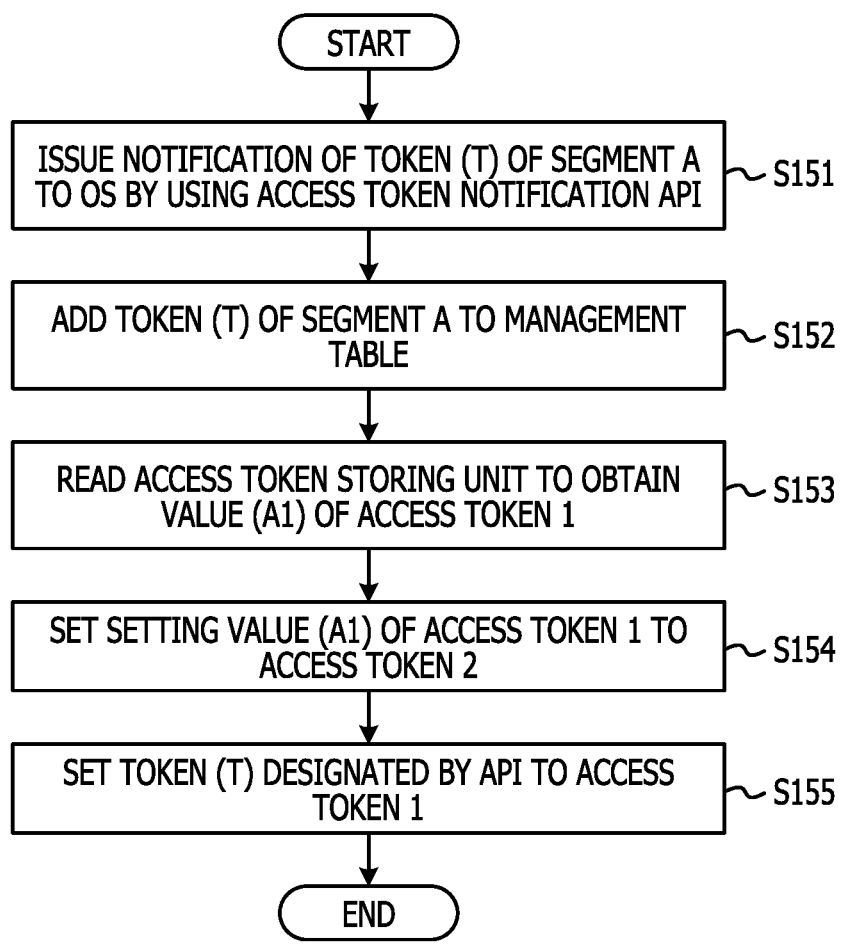
FIG. 11 is a flow chart illustrating an example of processing for setting two access tokens.

FIG. 11 is a flow chart illustrating an example of processing for setting two access tokens by the access token setting unit 72 and the management table recording unit 73. First, the application program uses the token notification API 71 to issue, to the OS 62, notification of tokens (T) corresponding to the segment (A) of the shared memory scheduled to be accessed by the program itself (S151). The management table recording unit 73 in the OS 62 records the token (T) of the segment (A) notified by the token notification API 71, as information of the token of the segment (A) in the management table 80 (S152).

The access token setting unit 72 of the OS 62 sets the token (T) of the segment (A) notified by the token notification API 71 in the access token storing unit 35. At this time, the setting in the access token storing unit 35 is performed so that the setting values of the new access tokens remain longer than those of the oldest access tokens when a plurality of access tokens are already set in the access token storing unit 35.

Specifically, the access token setting unit 72 reads the access token storing unit 35 and obtains a value (A1) of an access token 1 (S153). The value (A1) of the access token 1 obtained in step S153 is set to the access token 2 in the access token storing unit 35 (S154). Next, the token (T) of the segment (A) notified by the token notification API 71 in step S151 is set to the access token 1 of the access token storing unit 35 (S155).

Due to the setting in the access token storing unit 35 based on the procedures in steps S153 to S155, the time period during which the setting of the tokens is performed can be controlled so that the setting values of newer tokens remain in the access token storing unit 35.

If the access token 1 and the access token 2 can be set only once as in a case when the setting in the access token storing unit 35 is performed first, steps S153 and S154 can be omitted and the setting of the access token 1 and the access token 2 may be performed only once.

Figure 12:
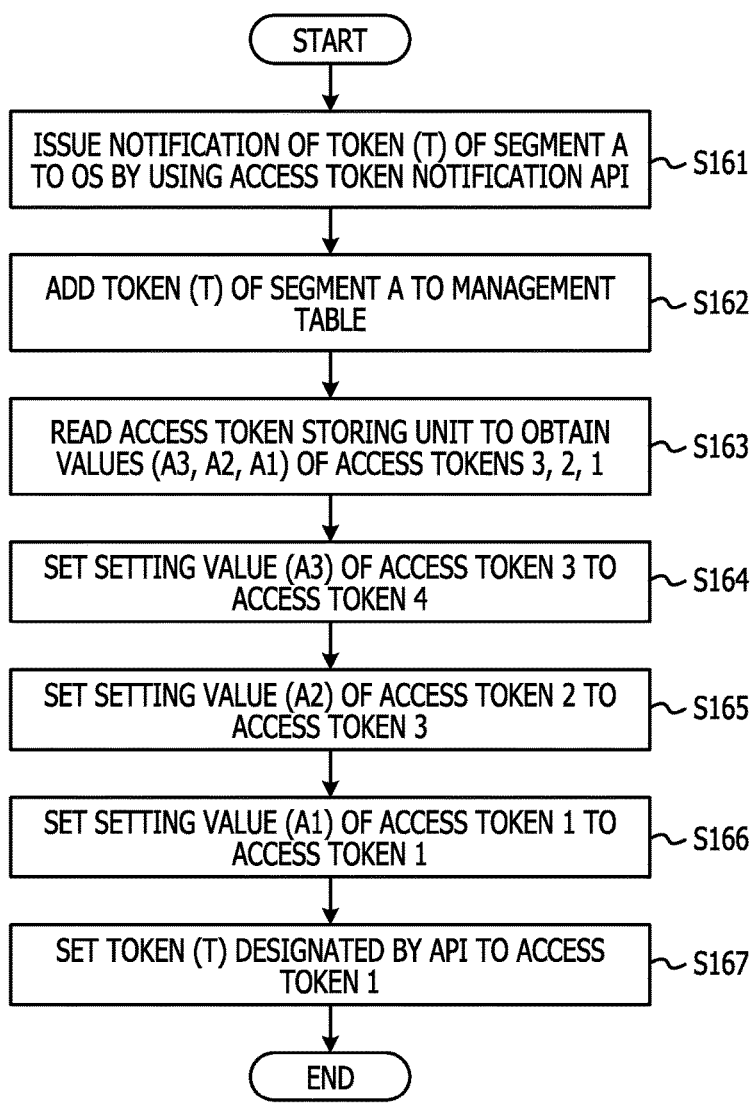
FIG. 12 is a flow chart illustrating an example of processing for setting four access tokens.

FIG. 12 is a flow chart illustrating an example of processing for setting four access tokens by the access token setting unit 72 and the management table recording unit 73. Steps S161 and S162 in FIG. 12 correspond respectively to steps S151 and S152 in FIG. 11 and are omitted from the explanation.

When four access tokens are set in the access token storing unit 35, first the access token storing unit 35 is read to obtain values (A3, A2, A1) of the access tokens 3, 2 and 1 (S163). Next, the value (A3) of the access token 3 is set to the access token 4 (S164), the value (A2) of the access token 2 is set to the access token 3 (S165), and the value (A1) of the access token 1 is set to the access token 2 (S166).

Next, the token (T) of the segment (A) notified by the token notification API 71 in step S161 is set to the access token 1 of the access token storing unit 35 (S167). If the access tokens 1 to 4 can be set once, processing in steps S163 to S166 can be omitted and the access tokens 1 to 4 may be set only once.

Figure 13:
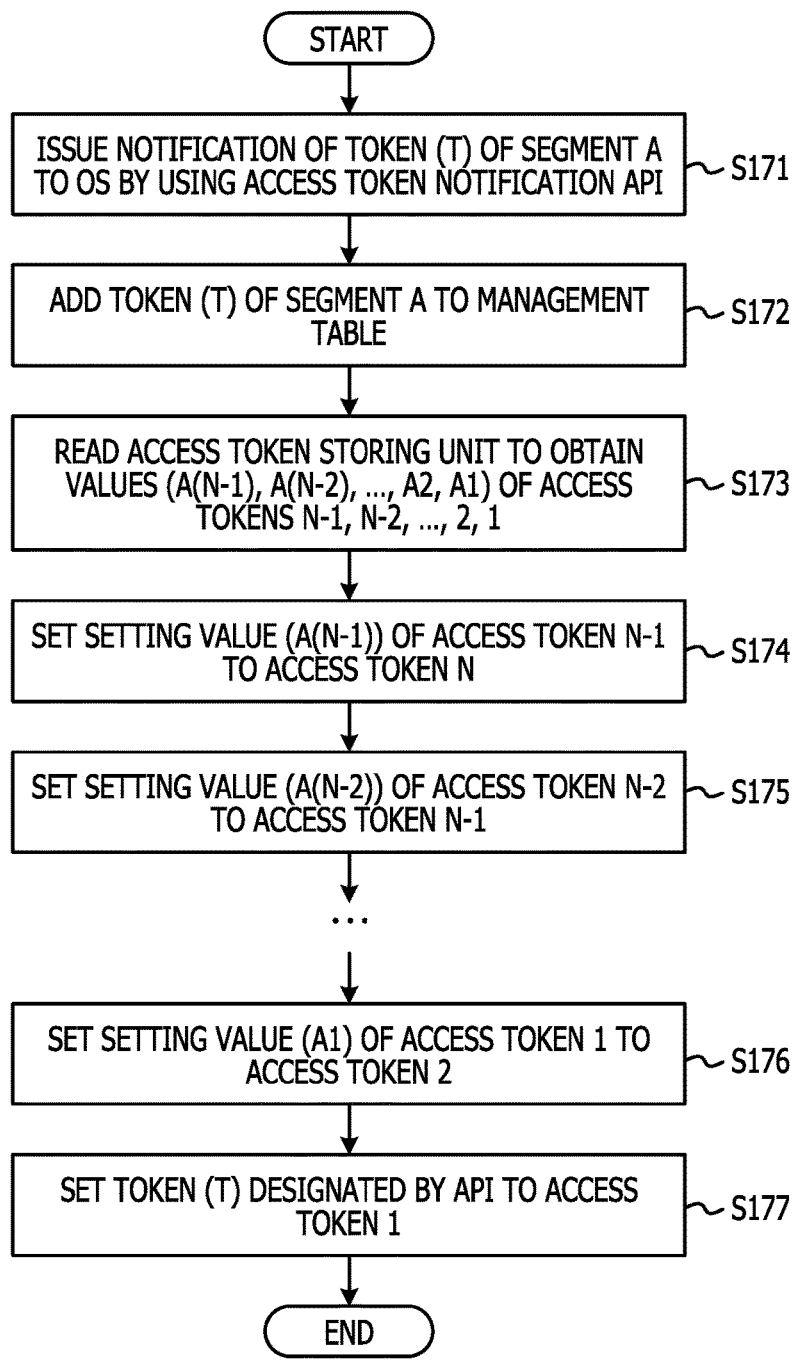
FIG. 13 is a flow chart illustrating an example of processing for setting N number of access tokens.

FIG. 13 is a flow chart illustrating an example of processing for setting N number of access tokens by the access token setting unit 72 and the management table recording unit 73. Steps S171 and S172 in FIG. 13 correspond respectively to steps S151 and S152 in FIG. 11 and are omitted from the explanation.

When N number of access tokens are set in the access token storing unit 35, first the access token storing unit 35 is read to obtain values (A(N), A(N−1), . . . , A2, A1) of the N number of access tokens (S173). Next, the value (A(N−1)) of the access token (N−1) is set to access token (N) (S174) and the value (A(N−2)) of the access token (N−2) is set to access token (N−1) (S175). The same processing is repeated until the value (A1) of the access token 1 is set to the access token 2 (S176).

Next, the token (T) of the segment (A) notified by the token notification API 71 in step S171 is set to the access token 1 of the access token storing unit 35 (S177). If the access token 1 to access token N can be set once, processing in steps S173 to S176 can be omitted and the access token 1 to access token N may be set only once.

Figure 14:
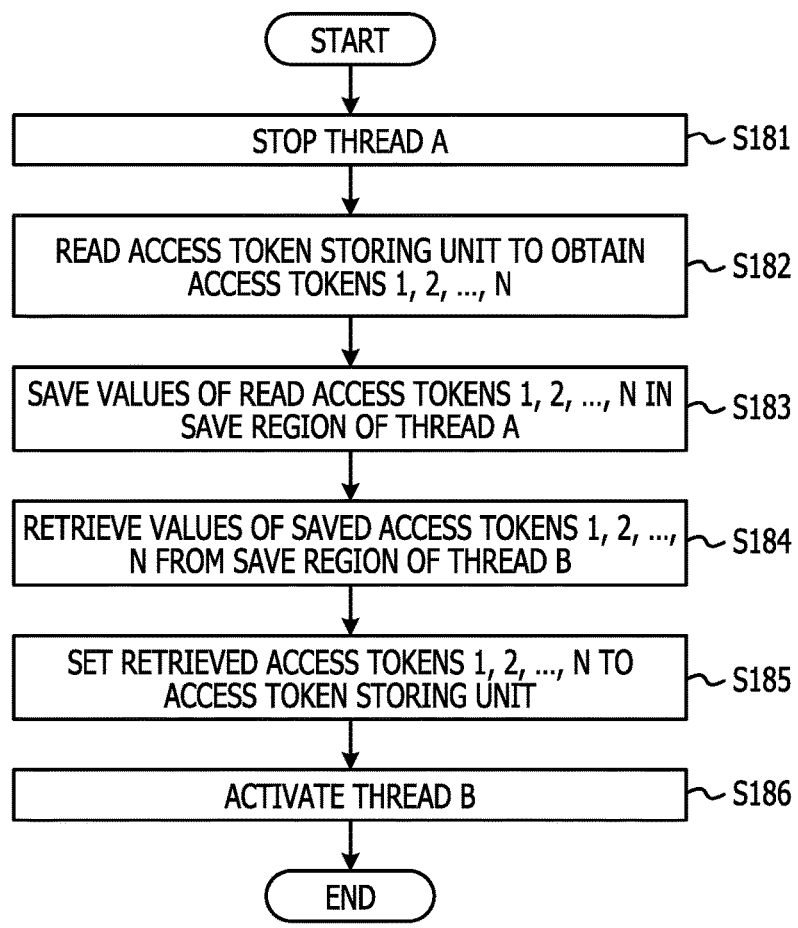
FIG. 14 is a flow chart explaining an example of saving and recovering access tokens during context switch processing.

FIG. 14 is a flow chart explaining an example of saving and recovering access tokens during context switch processing.

The context switch processing unit 74 receives an instruction from the OS 62 and performs processing to save and recover information stored in the registers during a context switch in which the process of the application program being executed in the strand 16 in the CPU core 12 is changed. Here, a case in which a context switch for changing a thread A to a thread B in a process executed in the strand 16 will be discussed as an example.

The context switch processing unit 74 receives from the OS 62 an instruction for a context switch for changing the thread A to the thread B and first stops the execution of the thread A (S181). Next, the context switch processing unit 74 reads the access token storing unit 35 to obtain the values of the access token 1, the access token 2, . . . , and the access token N (S182). Then, the N number of obtained access tokens are saved in a save area of the thread A provided in the local memory 52 or the like (S183). At this time, the values of the registers holding the information pertaining to the processing of the thread A among the registers included in the register unit 34 are saved in the save area of the thread A.

After saving the information in the registers pertaining to the thread A, the context switch processing unit 74 retrieves the N number of access tokens previously saved in the thread B from the save area in the thread B (S184) and sets the retrieved N number of access tokens in the access token storing unit 35 (S185). At this time, values in other registers for executing the thread B are retrieved from the save area of the thread B and set.

After the information in the registers pertaining to the thread B is recovered, the context switch processing unit 74 activates the thread B (S186) and completes the context switch processing.

Figure 15:
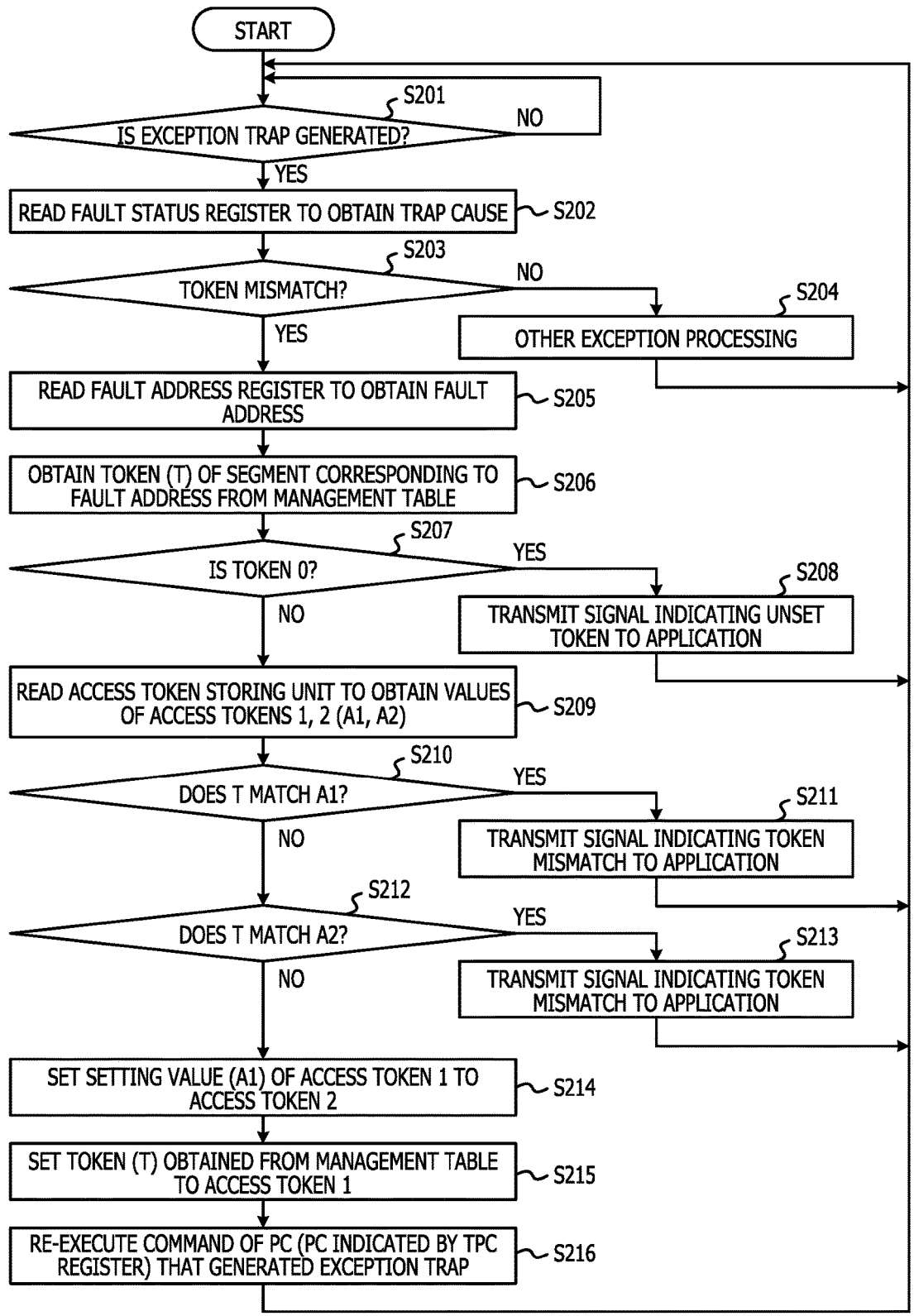
FIG. 15 is a flow chart explaining an example of exception trap processing when a shared memory is accessed using two access tokens.

FIG. 15 is a flow chart illustrating an example of processing when a shared memory is accessed using two tokens and a token mismatch exception trap is generated.

Access is executed if no exception trap is generated in the processing for accessing the shared memory using the access token (S201 No). When accessing the shared memory, a token non-match exception trap is generated if any of the plurality of access tokens included in the request for conducting the access do not match the memory token. When the token mismatch exception trap is generated (S201 Yes), the exception trap handler 75 that receives the exception trap reads the fault status register 342 and obtains the information of the cause of the trap (S202).

If the cause of the trap obtained from the fault status register 342 is a token mismatch (S203 Yes), the processing advances to step S205 and the exception trap handler 75 causes the token comparing unit 76 to compare the tokens. If the cause of the trap obtained from the fault status register 342 is not a token mismatch (S203 No), the exception trap handler 75 executes other exception processing (S204).

In step S205, the token comparing unit 76 first reads the fault address register 343 and obtains the information of the fault address in which the token mismatch exception trap is generated. The token comparing unit 76 specifies the segment of the shared memory that the application attempted to access from the obtained fault address information and the information stored in the management table 80, and obtains the value (T) of the token of the specified segment from the management table 80 (S206).

If the value (T) of the token obtained from the management table 80 is "0" (S207 Yes), the token comparing unit 76 causes the token error notification unit 77 to issue notification of an unset token signal to the application program (S208). If the value (T) of the token obtained from the management table 80 is not "0", the processing advances to step S209 and the token comparing unit 76 compares the tokens. While the present embodiment assumes the token is not set if the value (T) of the token is "0", the definition of the unset token may be carried out in any way and, for example, the definition of the unset token may use "FFF" as a hexadecimal.

The token comparing unit 76 first reads the access token storing unit 35 and obtains the value (A1) of the access token 1 and the value (A2) of the access token 2 in step S209.

If the value (T) of the token obtained from the management table 80 matches the value (A1) of the access token 1 (S210 Yes), the processing advances to S211. In this case, a token mismatch exception trap with the memory token is generated regardless of whether or not T and A1 match, and thus there is a token setting problem. As a result the token comparing unit 76 causes the token error notification unit 77 to transmit the token mismatch signal to the application program (S211).

If the token (T) and the access token (A1) do not match (S210 No), the token (T) is compared with the access token (A2) next (S212). If the token (T) and the access token (A2) match (S212 Yes), the token comparing unit 76 causes the token error notification unit 77 to transmit the token mismatch signal in the same way as in step S211 (S213).

After confirming that the token (T) does not match the access token (A2) and that the token (T) does not match any of the access tokens (S212 No), the processing advances to step S214.

The access token resetting unit 78 resets the access tokens in step S214. When resetting the tokens in the access token storing unit 35, the access token resetting unit 78 performs the setting in the access token storing unit 35 so that the setting value of the newest access token remains longer than that of the oldest access tokens among the plurality of access tokens are already set in the access token storing unit 35.

Specifically, the access token resetting unit 78 sets the setting value (A1) of the access token 1 to the access token 2 in the access token storing unit 35 (S214). Next, the access token resetting unit 78 sets the value of the token (T) obtained from the management table 80 to the access token 1 (S215).

After the access tokens have been reset by the access token resetting unit 78, the access re-executing unit 79 uses the reset tokens to re-execute the access to the access target in which the token mismatch exception trap is generated (S216). Because the reset access token matches the memory token corresponding to the segment of the access target so long as no token setting mistake has occurred, the re-executed memory access is carried out normally. Next, the processing returns to step S201 and the processing is continued.

Figure 16A:
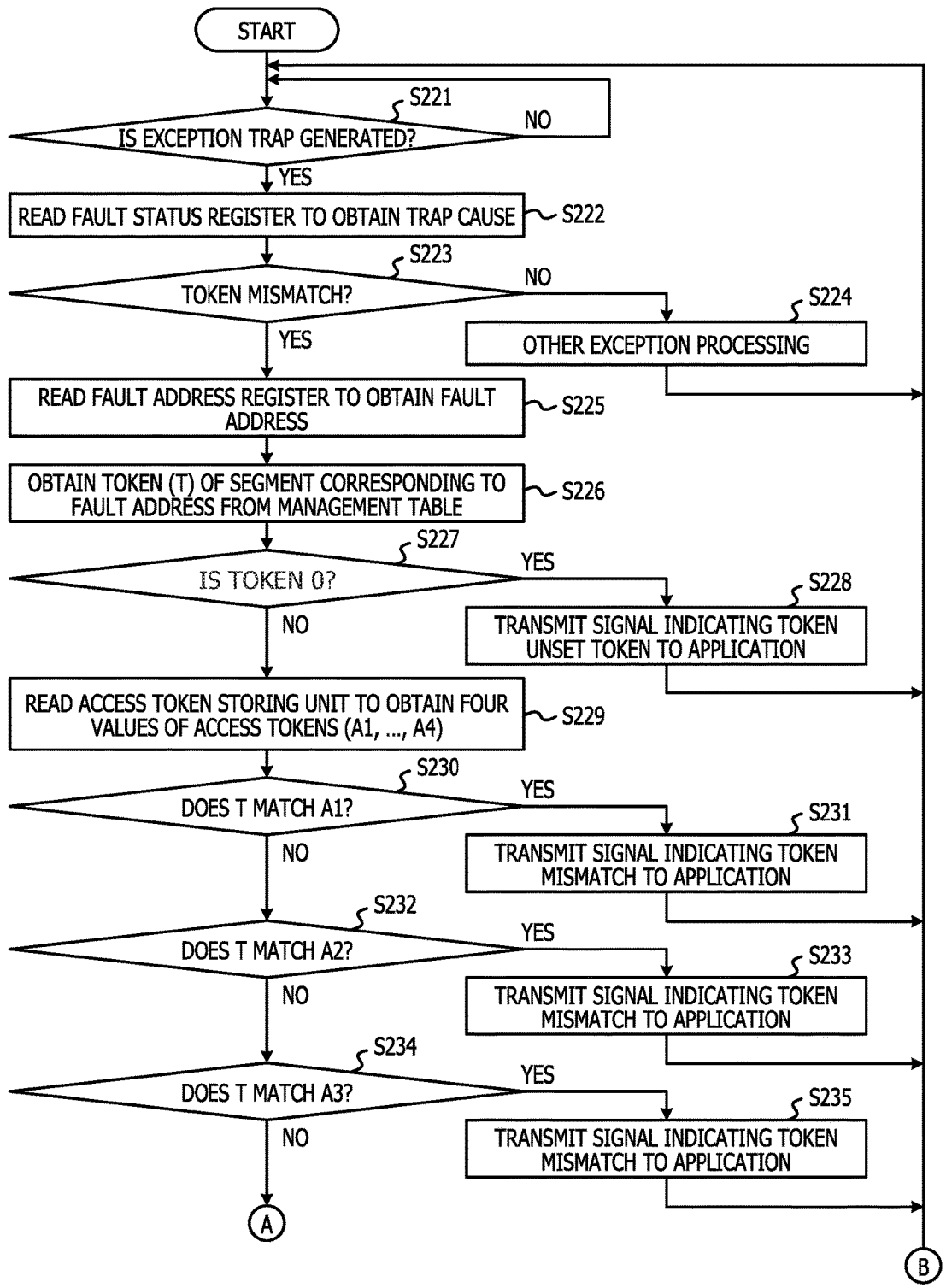
FIG. 16A and FIG. 16B are flow charts explaining an example of exception trap processing when a shared memory is accessed using four access tokens.
Figure 16B:
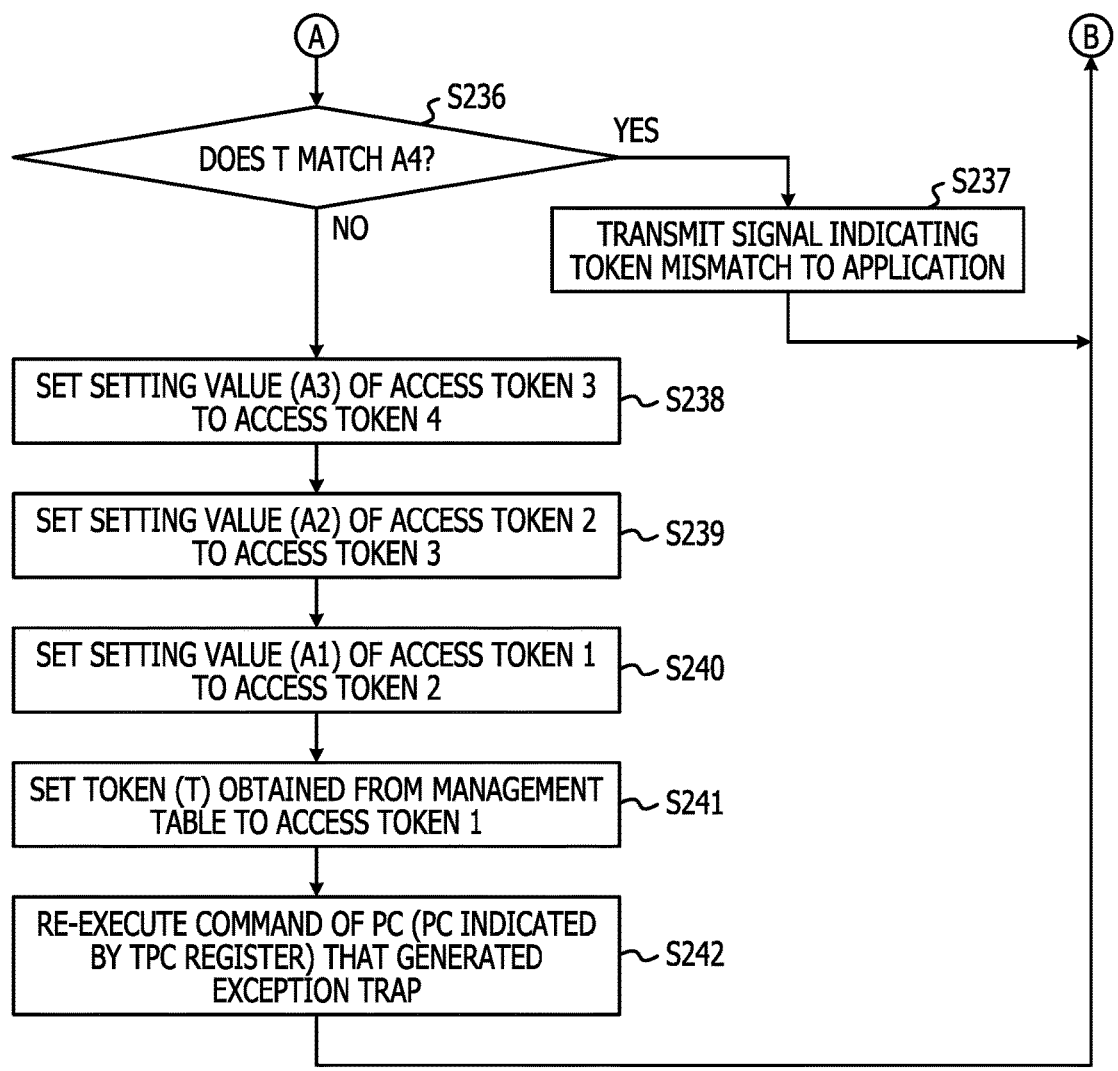

FIG. 16A and FIG. 16B are flow charts illustrating an example of processing when a shared memory is accessed using four tokens and a token mismatch exception trap is generated. The processing in steps S221 to S228 is the same as the processing in steps S201 to S208 in FIG. 15 and thus is omitted from the explanation.

Because a case of using four access tokens is discussed in FIG. 16A and FIG. 16B, the token comparing unit 76 reads the access token storing unit 35 and obtains four access token values (A1, A2, A3, A4) in step S229. The four access tokens (A1, A2, A3, A4) are compared with the token (T) obtained from the management table 80 and matches between the tokens are determined (S230, S232, S234, S236). If the token (T) matches any of the four access tokens (A1, A2, A3, A4), an exception due to the mismatch with the memory token is generated regardless of whether or not the token (T) matches any of the access tokens, and there is a token setting problem. As a result, the token comparing unit 76 causes the token error notification unit 77 to transmit the token mismatch signal to the application program (S231, S233, S235, S237).

The access token resetting unit 78 resets the access tokens in step S238. When resetting the tokens in the access token storing unit 35, the access token resetting unit 78 performs the setting in the access token storing unit 35 so that the setting value of the newest access token remains longer than that of the oldest access tokens among the plurality of access tokens are already set in the access token storing unit 35.

Because four tokens are used in the example in FIG. 16A and FIG. 16B, the value (A3) of the access token 3 is set to the access token 4 (S238), and the value (A2) of the access token 2 is set to the access token 3 (S239). Then, the value (A1) of the access token 1 is set to the access token 2 (S240), and the value of the token (T) obtained from the management table 80 is set to the access token 1 (S241).

After the access tokens have been reset by the access token resetting unit 78, the access re-executing unit 79 uses the reset tokens to re-execute the access to the access target in which the token mismatch exception trap is generated (S242).

Figure 17A:
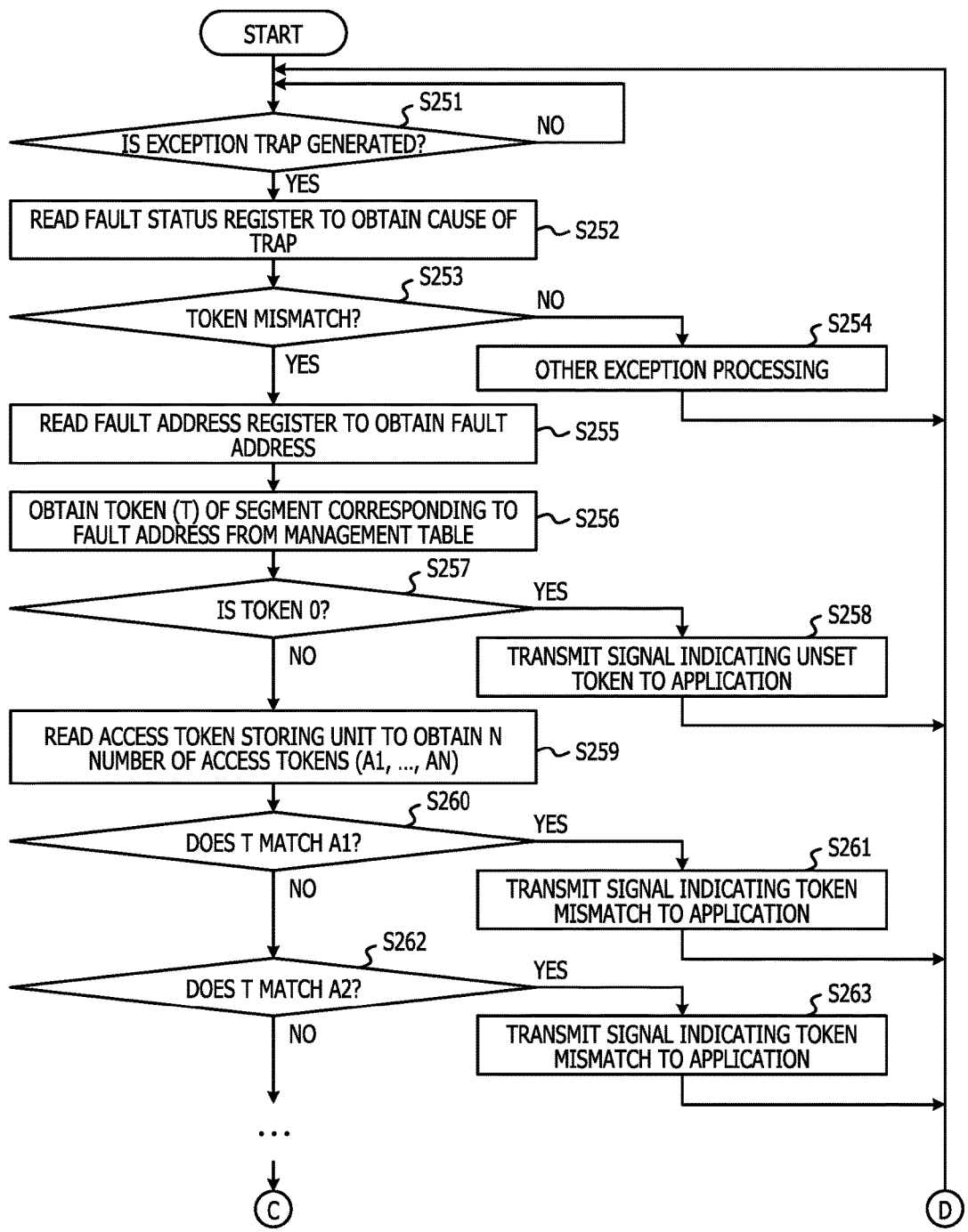
FIG. 17A and FIG. 17B are flow charts explaining an example of exception trap processing when a shared memory is accessed using N number of access tokens.
Figure 17B:
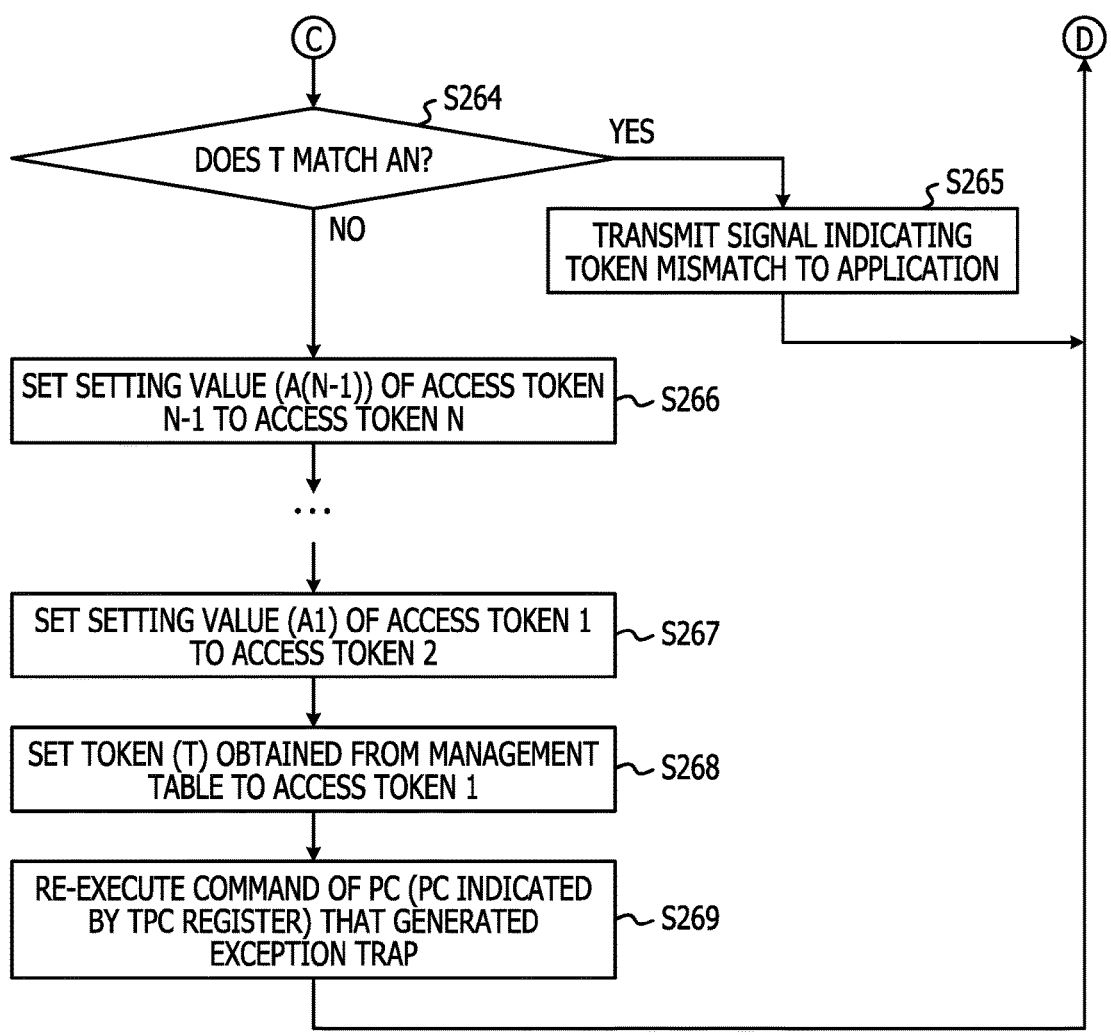

FIG. 17A and FIG. 17B are flow charts illustrating an example of processing when a shared memory is accessed using N number of tokens and a token mismatch exception trap is generated. The processing in steps S251 to S258 is the same as the processing in steps S201 to S208 in FIG. 15 and thus is omitted from the explanation.

Because a case of using N number of access tokens is described in FIG. 17A and FIG. 17B, the token comparing unit 76 reads the access token storing unit 35 and obtains N number of access token values (A1, A2, . . . , A(N)) in step S259. The N number of access tokens (A1, A2, . . . , A(N)) are compared with the token (T) obtained from the management table 80 and matches between the tokens are determined (S260, S262, S234). If the token (T) matches any of the N number of access tokens (A1, A2, . . . , A(N)), an exception due to the mismatch with the memory token is generated regardless of whether or not the token (T) matches any of the access tokens, and there is a token setting problem. As a result, the token comparing unit 76 causes the token error notification unit 77 to transmit the token mismatch signal to the application program (S261, S263, S265).

The access token resetting unit 78 resets the access tokens in step S266. When resetting the tokens in the access token storing unit 35, the access token resetting unit 78 performs the setting in the access token storing unit 35 so that the setting value of the newest access token remains longer than that of the oldest access tokens among the plurality of access tokens are already set in the access token storing unit 35.

Because N number of access tokens is used in the example in FIG. 17A and FIG. 17B, the value (A(N−1)) of the access token (N−1) is set to the access token (N) (S266) and the access tokens subsequent to the access token (N−1) are set in the same way. Then, the value (A1) of the access token 1 is set to the access token 2 (S267), and the value of the token (T) obtained from the management table 80 is set to the access token 1 (S268).

After the access tokens have been reset by the access token resetting unit 78, the access re-executing unit 79 uses the reset tokens to re-execute the access to the access target in which the token mismatch exception trap is generated (S269).

Figure 18:
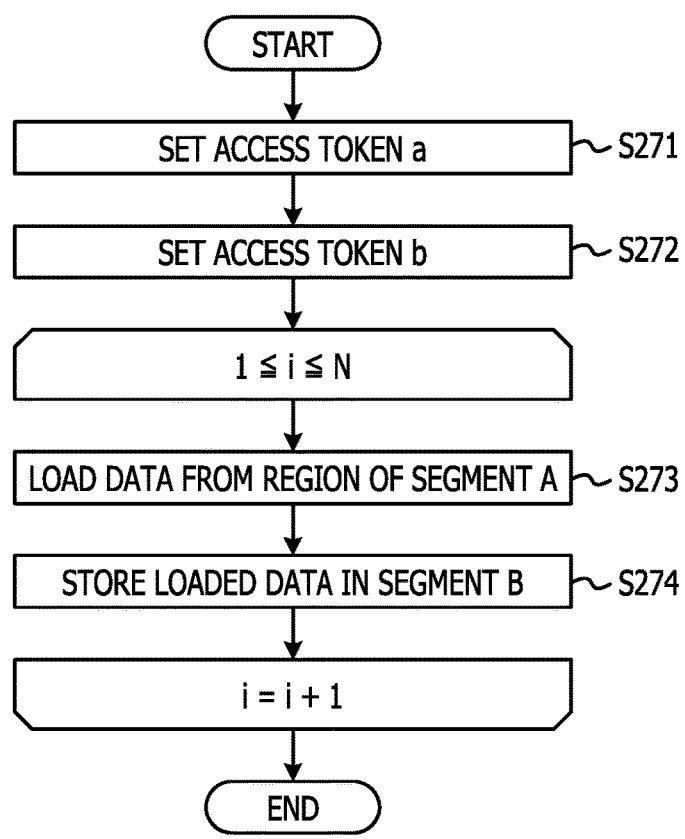
FIG. 18 is a flow chart illustrating an example of processing when copying data between memories using two access tokens.

FIG. 18 is a flow chart illustrating an example of processing when copying data between shared memories using two access tokens. If the application program originally only uses two segments or if the respective tokens (a, b) of the segment A that is the transfer source and of the segment B that is the transfer destination are understood when copying the data, the suitable access tokens can be set in advance.

In the case of this example, the access token setting unit 72 sets, for example, "a" to the access token 1 (S271) and sets "b" to the access token 2 in the access token storing unit 35 (S272). The data from the region of the segment A is loaded into the register X included in the general purpose register 341 N number of times (S273), and then the data in the register X is stored in the region of the segment B (S274).

Each request for accessing the segments A and B is transmitted while adding two access tokens (a, b) stored in the access token storing unit 35 in the processing for loading and storing in steps S273 and S274. Because the two access token values "a" and "b" added to each request respectively match the memory token (a) of the segment A and the memory token (b) of the segment B, the token mismatch exception is not generated and the access can be carried out normally.

In the present embodiment, a plurality of access tokens previously stored in the access token storing unit 35 are added to each request for accessing the plurality of segments in the shared memory and transmitted. By enabling the determining unit 23 to compare the memory token with each of the plurality of access tokens added to the requests, the processing for resetting the tokens each time an application program performs a memory access as illustrated in FIG. 22 can be omitted. Therefore, overhead for resetting the access tokens can be reduced when accessing a plurality of memory regions set with different memory tokens and the accessibility of the shared memory can be improved.

Figure 19:
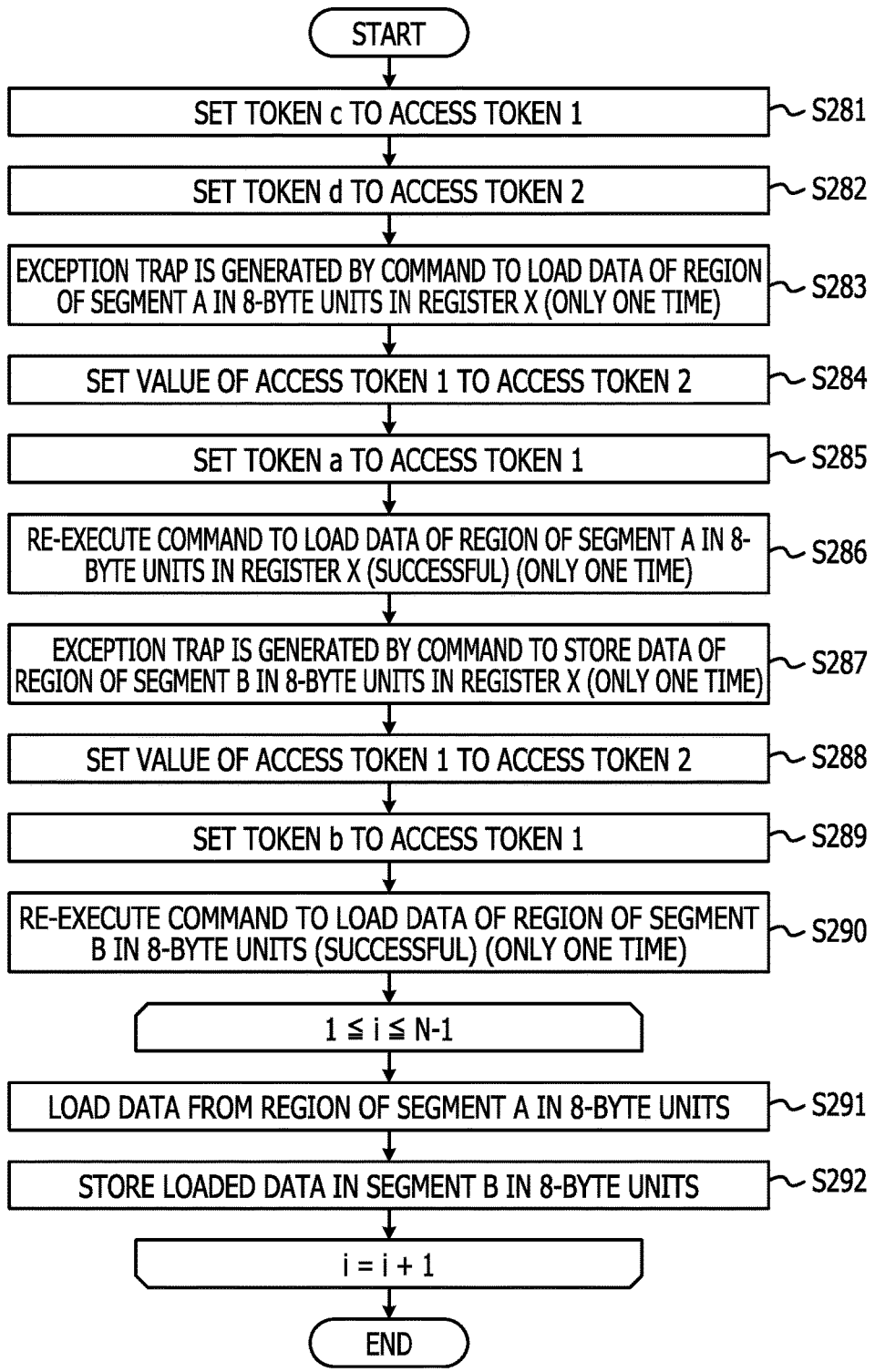
FIG. 19 is a flow chart illustrating an example of processing when copying data between memories using four access tokens.

FIG. 19 is a flow chart illustrating an example when an application program schedules the use of segments in four shared memories when two access tokens are used for copying data (N×8 bytes) between shared memories. Tokens "c" and "d" which are different from the token "a" of the segment A that is the transfer source of the data and the token "b" of the segment B that is the transfer destination of the data are used in the data copy processing after being set in the access token storing unit 35 in the explanation of the example illustrated in FIG. 19.

First, the access token setting unit 72 sets the token "c" to the access token 1 (S281) and sets the token "d" to the access token 2 (S282) in the access token storing unit 35. When the application program loads the data of the region of the segment A in 8-byte units in the above state, the access tokens added to the requests are access tokens "c" and "d" and do not match the token "a" of the segment A, and thus an exception trap is generated (S283).

When the exception trap due to the token mismatch is generated, the exception trap processing as illustrated in FIG. 15 is performed and the token "a" of the segment A is set to the access token 1 and the token "c" is set to the access token 2 in steps S284 and S285 in FIG. 19. Next, when the command for loading the data of the region in segment A in 8-byte units in the register X is re-executed, the access token "a" is not included in the request and therefore no token mismatch error is generated and the data can be loaded from the segment A normally (S286).

After the data of the segment A is loaded in 8-byte units and stored in the register X in step S286, the application program stores the data from the register X in 8-byte units in the segment B (S287). While the access tokens "c" and "a" are included in the request for storing in the segment B, the token "b" of the segment B is not included in the request. As a result, the token mismatch exception trap is generated while storing in the segment B (S287).

Even if the exception trap is generated when storing in the segment B, the exception trap processing as illustrated in FIG. 15 is performed and the processing for resetting the access tokens is performed in steps S288 and S289 in FIG. 19. In this case, the value "a" of the access token 1 is set to the access token 2 (S288) and the token "b" corresponding to the segment B is set to the access token 1 (S289). Next, because the access token "b" is included in the request when the storing in 8-byte units to the segment B is re-executed, no token mismatch error is generated and the storing of the data in the segment B can be carried out normally (S290).

Because "a" and "b" are stored as the access tokens in the access token storing unit 35 for accesses thereafter, the access tokens "a" and "b" are added to requests for accessing each of the regions in the segment A and the segment B and transmitted. As a result, the exception trap due to the token mismatch is not generated even when the application program continues and accesses both the segment A and the segment B, and the data can be transferred normally between the shared memories. That is, the data transfer in N×8-byte units between the segments A and B can be carried out by repeating the load processing in step S291 and the store processing in step S292 N−1 number of times.

While overhead is generated first in steps S283 to S290 in the example in FIG. 19, no token mismatch exception traps is generated in subsequent processing. As a result, the overhead generated in FIG. 19 can be ignored if the amount of data transferred between segments is large.

In the example illustrated in FIG. 19, a plurality of access tokens previously stored in the access token storing unit 35 are added to each request for accessing the plurality of segments in the shared memories and transmitted. Then, access is determined by the determining unit 23 in accordance with whether or not the memory tokens in each of the requests correspond to any of the plurality of access tokens included in the requests. Therefore, even when data is copied among a plurality of segments, access tokens do not have to be set for each access of the transfer source and transfer destination of the data, and the overhead for resetting the access tokens can be reduced. As a result, shared memory access performance can be improved.

When the exception trap is generated due to the token mismatch in the present embodiment, the shared memory managing unit 70 of the OS 62 performs the exception trap processing as illustrated in FIG. 15. As a result, even if the number of tokens scheduled to be used by the application program is greater than the number of access tokens stored in the access token storing unit 35, access tokens do not have to be reset by the application program. Therefore, even when data transfer is performed between different segments in a shared memory, the access token resetting processing by the application program is unnecessary and the access of the shared memory can be performed efficiently.

Embodiment 2

Figure 20:
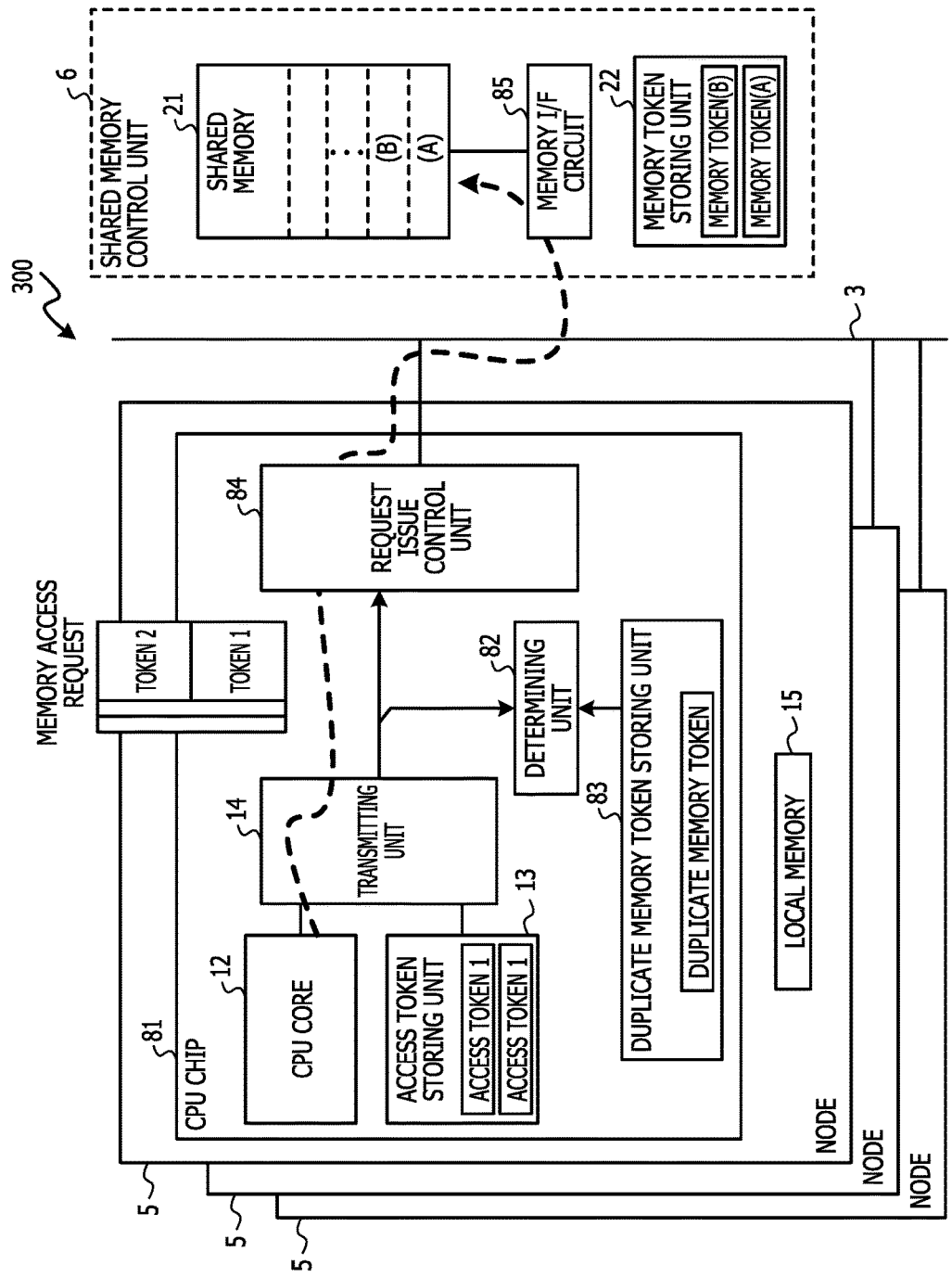
FIG. 20 is an example of a configuration of an information processing system according to a second embodiment.

FIG. 20 illustrates an example of a configuration of an information processing system 300 according to a second embodiment. As illustrated in FIG. 20, the information processing system 300 includes a plurality of nodes 5 and a shared memory control unit 6. The shared memory control unit 6 illustrated with a dashed line in the same way as in FIG. 1, is provided in each node 5 so as to be capable of acting as a shared storage device that can be accessed by the plurality of nodes and thus can be shared among the plurality of nodes 5. In the following explanation, the shared memory control unit 6 is provided in each node 5 for convenience, and is assumed as being used in the information system of the intra-node shared memory as illustrated in FIGS. 2 and 3.

A CPU 81 provided in each node 5 has the CPU core 12, the access token storing unit 13, the transmitting unit 14, a determining unit 82, a duplicate memory token storing unit 83, and a request issue control unit 84. The CPU core 12, the access token storing unit 13, and the transmitting unit 14 are the same as those illustrated in FIG. 1 and explanations thereof are omitted.

As illustrated in FIG. 20, the information processing system 300 according to the second embodiment differs from the first embodiment by having the determining unit 82 and the duplicate memory token storing unit 83 in the CPU 81 in each remote node. The determining unit 82 and the duplicate memory token storing unit 83 are provided in each CPU core 12. When each CPU core 12 has the plurality of strands 16 as illustrated in FIGS. 2 and 3, the determining unit 82 and the duplicate memory token storing unit 83 can be provided in each strand 16.

The duplicate memory token storing unit 83 stores a duplicate memory token which is a duplicate of the memory token of the segment in the shared memory scheduled to be accessed by the corresponding CPU core 12. The transmitting unit 14 adds the plurality of access tokens stored in the access token storing unit 13 to the request outputted by the CPU core 12 and outputs the request in the same way as in FIG. 1.

The determining unit 82 is a circuit that refers to the plurality of access tokens included in the request outputted by the transmitting unit 14 and the duplicate memory token retrieved from the duplicate memory token storing unit 83 and determines whether the access of the request is permitted or not. While the determining unit 82 has the same configuration as the circuit of the determining unit 23 illustrated in FIG. 6, the determining unit 82 differs in that the inputted memory token is the duplicate memory token corresponding to the segment of the access target of the request. That is, the determining unit 82 permits the access of the request according to whether or not the duplicate memory token matches any of the plurality of access tokens included in the request.

The request issue control unit 84 is a circuit for issuing the request outputted by the transmitting unit 14 when the determining unit 82 permits the access indicated in the request. Specifically, the request issue control unit 84 uses the access permission signal or the token error signal outputted by the determining unit 82 (see FIG. 6) to control the issuance of the request.

If the determining unit 82 does not permit the access of the request, the request issue control unit 84 issues notification of the fact that the token mismatch exception has occurred to the CPU core 12 by issuing an error reply with regard to the request. Moreover, the request issue control unit 84 may be installed so that the fact that the determining unit 82 does not permit the access of the request is received and the token mismatch exception is issued by the request issue control unit 84 and the CPU core 12 is informed.

The storage of the duplicate memory token in the duplicate memory token storing unit 83 may be performed while storing the token notified by OS 62 operated by the CPU core 12 from the application program operated by the OS 62 in the management table 80. Alternatively, the CPU core 12 of the home node may store the duplicate memory token in the duplicate memory token storing unit 83 in the remote node that uses the same segment while the CPU core 12 of the home node stores the memory token of the segment to be used in the memory token storing unit 22.

The shared memory control unit 6 includes the shared memory 21, the memory token storing unit 22, and a memory interface (I/F) circuit 85. The shared memory 21 and the memory token storing unit 22 are the same as those illustrated in FIG. 1 and explanations thereof are omitted. While the memory interface (I/F) circuit 85 is a circuit for performing access control of the request for accessing the shared memory, the memory interface (I/F) circuit 85 controls the memory access without referring to the comparison result of the determining unit 82 which differs from the example illustrated in the first embodiment. The setting of the memory token in the memory token storing unit 22 is the same as the example illustrated in FIG. 10 for example, and the OS 62 operating in the CPU core 12 in the home node receives the notification from the application program operated by the OS 62 and performs the setting.

The operations of the OS 62 operated by the information processing system 300 and the operations of the application program operated by the OS 62 according to the second embodiment are performed in the same way as the contents explained with reference to FIGS. 7 and 10 in the first embodiment.

The determining unit 82 and the duplicate memory token storing unit 83 are provided in each strand 16 or in each CPU core 12 inside the CPU 81 on the remote node side, whereby the permission of the access indicated in the request can be determined at an earlier stage. That is, whereas the request transmitted from the CPU core 12 of the remote node, for example, reaches the determining unit 23 of the shared memory control unit in the home node via the interconnect 3 so that the access of the request is first understood in the examples illustrated in FIGS. 1 and 2, the example illustrated in the second embodiment can be understood at an earlier stage.

Other Embodiments

While the preferred embodiments of the present disclosure have been explained above, the present disclosure is not limited to the specific embodiments and various changes and modifications are possible. For example, while the determining unit 82 and the duplicate memory token storing unit 83 are provided in each CPU core 12 on the remote node side in the second embodiment among the embodiments discussed herein, the following modified example is also possible.

For example, if the CPU 81 has a plurality of CPU cores 12 and the CPU cores 12 have a plurality of strands 16, a shared duplicate memory token storing unit 83 that corresponds to the plurality of CPU cores 12 and the plurality of strands 16 may be provided as a first modified example. In this case, the determining unit 82 provided in each CPU core 12, for example, retrieves the duplicate memory token corresponding to the segment of the access target from the duplicate memory token storing unit 83 and uses the duplicate memory token for determining the access permission. By storing the duplicate memory tokens together in a storage circuit such as a RAM, the duplicate memory tokens can be stored efficiently.

Moreover, a portion of an address conversion table used by an address conversion circuit (not illustrated) provided in each CPU core 12 can be used as the duplicate memory token storing unit 83 as a second modified example. In this case, the circuit of the determining unit 82 may also be installed in a circuit for converting a virtual address (VA) outputted by the CPU core 12 to a real address (RA) or a physical address (PA) so as to perform address conversion and access permission determination one time. By including the duplicate memory token storing unit 83 in the address conversion table, the duplicate memory tokens can be stored efficiently. By installing the determining unit 82 in a portion of the address conversion circuit, the access permission can be determined efficiently along with the address conversion.

The determining unit 82, the duplicate memory token storing unit 83, and the CPU core 12 may be arranged between the primary cache memories 36 or the secondary cache memories 39 as a third modified example. In doing so, the determining unit 82 can determine access permissions along with the data of the segments cached in the primary cache memory 36 or the secondary cache memory 39.

A non-temporary computer-readable recording medium that records a computer program for causing a computer to execute the abovementioned information processing system and the information processing method and the program thereof, may be included in the scope of the present disclosure. The non-temporary computer-readable recording medium may be for example a memory card such as an SD memory card. The computer program may also be transmitted via a network such as the Internet, a wireless or wired communication line, or an electrical communication line without being limited to being recorded in the recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
    a shared memory including a plurality of regions including a first region;
    a memory token storing unit configured to store memory tokens, each of the memory tokens being allocated to each of the plurality of regions, and being used for controlling access to each of the plurality of regions;
    an access token storing unit configured to store access tokens for accessing to each of the plurality of regions, the access tokens including a first access token for accessing to the first region;
    a first processor configured to transmit a first request including the first access token for accessing the first region; and
    a determination circuit configured to
        receive the transmitted first request including the first access token,
        compare the first access token with a memory token of the first region, and
        when the memory token of the first region does not correspond to the first access token included in the first request, transmit, to the first processor, an error signal comparison,
    wherein the first processor is further configured to
        update, based on the error signal, the access token storing unit to change one of the access tokens to other access token, and
        after updating the access token storing unit, transmit, to the determination circuit, a second request including the other access token for accessing to the first region.

2. The information processing system according to claim 1, wherein
    the plurality of regions includes a second region, and
    when the first processor is to access the first region and the second region, the first processor is configured to add both the first access token and a second access token for accessing the second region to the first request to access the first region and the second region.

3. The information processing system according to claim 2, further comprising:
    a first node including
        the first processor, and
        the access token storing unit, and
    a second node including
        the shared memory,
        the memory token storing unit,
        the determining circuit, and
        a second processor configured to
            store the memory tokens in the memory token storing unit, and
            transmit, to the first processor before the first processor accesses the first region and the second region of the shared memory, one of the memory tokens corresponding to the first region as the first access token and one of the memory tokens corresponding to the second region as the second access token, wherein,
    the first processor is configured to store the received first and second access tokens in the access token storing unit.

4. The information processing system according to claim 1, wherein:
    the first processor is configured to execute an operating system (OS) program and an application program operated on the OS, and
    the updating of the access token storing unit and a memory access are executed by the OS.

5. The information processing system according to claim 4, wherein:
    the first node has a memory configured to store therein a plurality of access tokens including the access tokens, each of the plurality of access tokens is used to access one of the plurality of regions of the shared memory, the plurality of access tokens stored in the memory being received from the second processor, and the OS program executed by the first processor
retrieves an access token from the plurality of access tokens corresponding to a region of the shared memory to which the first request is to access, and update the access tokens stored in the access token storing unit by using the retrieved access token.

6. The information processing system according to claim 4, wherein:
updating of the access token storing unit is repeatedly performed until the memory access is performed successfully.

7. The information processing system according to claim 1, wherein
the access token storing unit is one of a register having a plurality of fields, a plurality of registers, or a First-In-First-Out (FIFO) buffer.

8. The information processing system according to claim 1, further comprising:
a first node including
the first processor,
the access token storing unit,
a second memory token storing unit configured to store memory tokens which is duplicated from the memory tokens stored in the memory token storing unit in a second node, and
the determination circuit, wherein the determination circuit reads a memory token from the second memory token storing unit; and
the second node including
the shared memory, and
the memory token storing unit.

9. The information processing system according to claim 1, wherein:
the first processor includes a plurality of processing units that perform arithmetic operations, and
the access token storing unit is provided for each of the plurality of processing units.

10. The information processing system according to claim 1, further comprising
a plurality of nodes, each of the plurality of nodes including:
the shared memory;
the memory token storing unit;
the access token storing unit;
the first processor; and
the determination circuit.

11. A method of controlling accessing to a shared memory including a plurality of regions, the method comprising:
storing access tokens for accessing to each of the plurality of regions in an access token storing unit, the access tokens including a first access token for accessing to a first region included in the plurality of regions;
storing memory tokens in memory token storing unit, each of the memory tokens being allocated to each of the plurality of regions, and being used for controlling access to each of the plurality of regions;

generating a first request including the first access token for accessing to the first region;
comparing the first access token with a memory token of the first region,
when the memory token of the first region does not correspond to the first access token included in the first request, updating the access token storing unit to change one of the access tokens to other access token; and
after updating the access token storing unit, generating a second request including the other access token for accessing to the first region.

12. The method according to claim 11, further comprising:
when a processor is to access the first region and a second region included in the plurality of regions, adding, by the processor, both the first access token and a second access token included in the plurality of access tokens to the first request to access the first region and the second region.

13. A non-transitory computer readable medium having stored therein a program that causes a computer to execute a process for controlling accessing to a shared memory including a plurality of regions, the process comprising:
storing access tokens for accessing to each of the plurality of regions in an access token storing unit, the access tokens including a first access token for accessing to a first region included in the plurality of regions;
storing memory tokens in memory token storing unit, each of the memory tokens being allocated to each of the plurality of regions, and being used for controlling access to each of the plurality of regions;
generating a first request including the first access token for accessing to the first region;
comparing the first access token with a memory token of the first region,
when the memory token of the first region does not correspond to the first access token included in the first request, updating the access token storing unit to change one of the access tokens to other access token; and
after updating the access token storing unit, generating a second request including the other access token for accessing to the first region.

14. The non-transitory computer readable medium according to claim 13, wherein the process further comprising:
retrieving an access token from the plurality of access tokens corresponding to a region of the shared memory to which the first request is to access; and
updating the access tokens stored in the access token storing unit by using the retrieved access token.

15. The non-transitory computer readable medium according to claim 13, wherein the process further comprising:
updating the access token storing unit repeatedly until the memory access is performed successfully using the updated access tokens.

* * * * *